US010454810B1

(12) United States Patent
Driscoll et al.

(10) Patent No.: US 10,454,810 B1
(45) Date of Patent: Oct. 22, 2019

(54) MANAGING HOST DEFINITIONS ACROSS A PLURALITY OF STORAGE SYSTEMS

(71) Applicant: Pure Storage, Inc., Mountain View, CA (US)

(72) Inventors: Alan Driscoll, Fremont, CA (US); David Grunwald, San Francisco, CA (US); Frederic Lherault, London (GB); Lawrence Mertes, San Jose, CA (US); Saurabh Shukla, San Jose, CA (US); Larry Touchette, Redwood City, CA (US)

(73) Assignee: Pure Storage, Inc., Mountain View, CA (US)

( * ) Notice: Subject to any disclaimer, the term of this patent is extended or adjusted under 35 U.S.C. 154(b) by 56 days.

(21) Appl. No.: 15/834,919

(22) Filed: Dec. 7, 2017

Related U.S. Application Data

(63) Continuation of application No. 15/683,823, filed on Aug. 23, 2017.

(Continued)

(51) Int. Cl.
*H04L 12/721* (2013.01)
*H04L 29/08* (2006.01)
*H04L 12/803* (2013.01)

(52) U.S. Cl.
CPC .......... *H04L 45/12* (2013.01); *H04L 67/1097* (2013.01); *H04L 45/38* (2013.01); *H04L 47/125* (2013.01)

(58) Field of Classification Search
CPC ..... H04L 45/12; H04L 67/1097; H04L 45/38; H04L 47/125
See application file for complete search history.

(56) References Cited

U.S. PATENT DOCUMENTS 5,706,210 A 1/1998 Kumano et al.
5,799,200 A 8/1998 Brant et al.
(Continued)

FOREIGN PATENT DOCUMENTS

EP 0725324 A2 8/1996
WO WO-2012/087648 A1 6/2012
(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.
(Continued)

*Primary Examiner* — Rina C Pancholi

(57) ABSTRACT

Managing host definitions across a plurality of storage systems, including: creating, on a first storage system, a host definition describing a host that accesses a dataset that is replicated across a plurality of storage systems; determining whether a second storage system that the dataset is replicated across includes a definition of the host; responsive to determining that the second storage system does not include a definition of the host, copying the host definition created on the first storage system to the second storage system; responsive to determining that the second storage system does include a definition of the host: linking the host definition created on the first storage system to the definition of the host on the second storage system or retaining the definition of the host on the second storage system.

18 Claims, 19 Drawing Sheets

Related U.S. Application Data

(60) Provisional application No. 62/470,172, filed on Mar. 10, 2017, provisional application No. 62/518,071, filed on Jun. 12, 2017.

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,555,021 B1 | 10/2013 | Barturen |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,444,822 B1 | 9/2016 | Borowiec et al. |
| 9,507,532 B1 | 11/2016 | Colgrove et al. |
| 9,626,116 B1 | 4/2017 | Martin et al. |
| 2001/0049749 A1* | 12/2001 | Katsuragi ............ G06F 11/2082 709/248 |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2004/0267829 A1* | 12/2004 | Hirakawa ............ G06F 11/2064 |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0124312 A1 | 5/2012 | Vemuri et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |

(56) References Cited

U.S. PATENT DOCUMENTS

| | | | |
|---|---|---|---|
| 2015/0134920 | A1 | 5/2015 | Anderson et al. |
| 2015/0149822 | A1 | 5/2015 | Coronado et al. |
| 2015/0193169 | A1 | 7/2015 | Sundaram et al. |
| 2015/0378888 | A1 | 12/2015 | Zhang et al. |
| 2016/0098323 | A1 | 4/2016 | Mutha et al. |
| 2016/0350009 | A1 | 12/2016 | Cerreta et al. |
| 2016/0352720 | A1 | 12/2016 | Hu et al. |
| 2016/0352830 | A1 | 12/2016 | Borowiec et al. |
| 2016/0352834 | A1 | 12/2016 | Borowiec et al. |
| 2017/0149883 | A1 | 5/2017 | Joshi et al. |

FOREIGN PATENT DOCUMENTS

| | | | |
|---|---|---|---|
| WO | WO-2013071087 | A1 | 5/2013 |
| WO | WO-2014/110137 | A1 | 7/2014 |
| WO | WO-2016/015008 | A1 | 12/2016 |
| WO | WO-2016/190938 | A1 | 12/2016 |
| WO | WO-2016/195759 | A1 | 12/2016 |
| WO | WO-2016/195958 | A1 | 12/2016 |
| WO | WO-2016/195961 | A1 | 12/2016 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/Term/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security and Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 17 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express as the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

\* cited by examiner

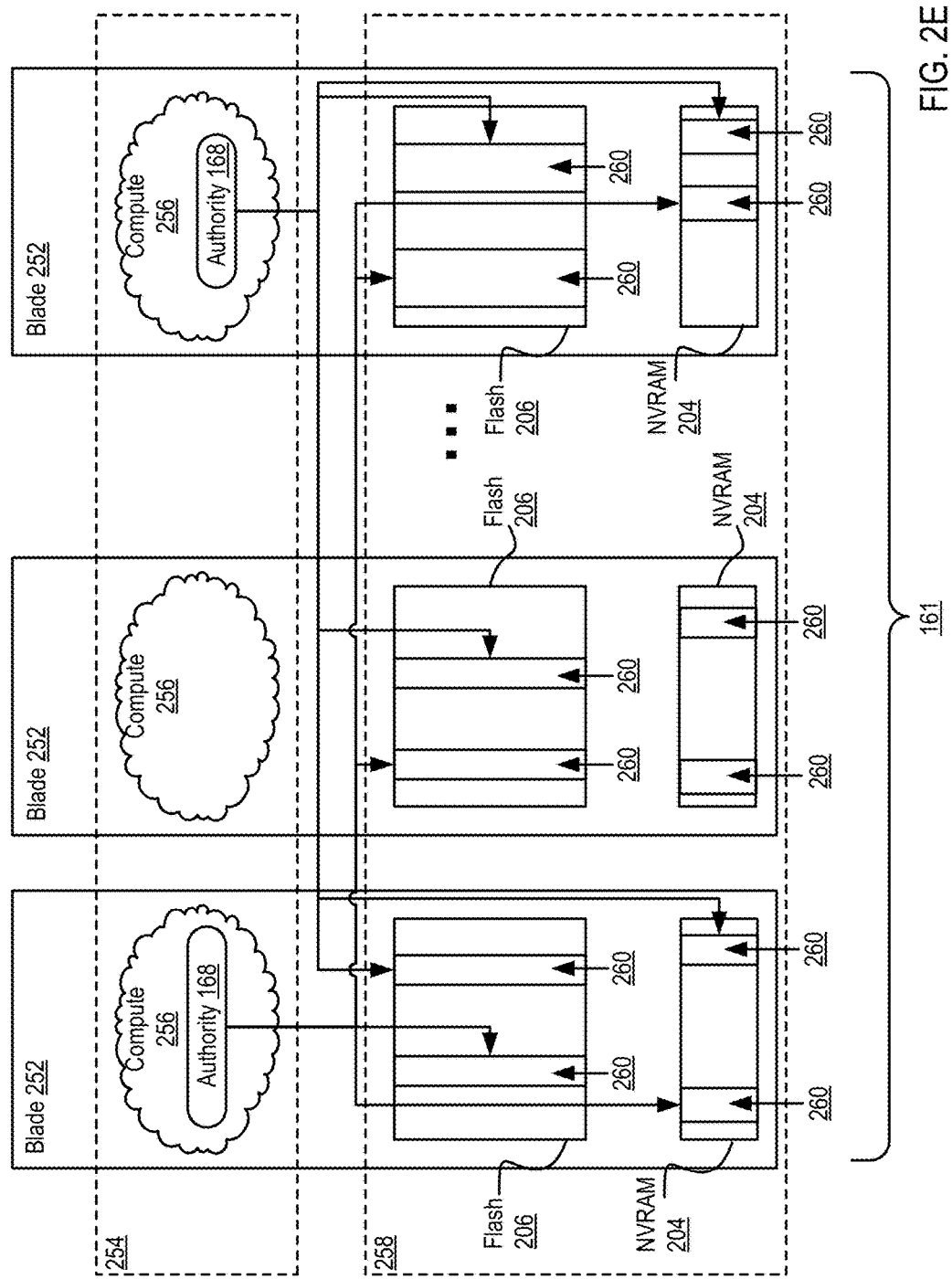

MANAGING HOST DEFINITIONS ACROSS A PLURALITY OF STORAGE SYSTEMS

CROSS-REFERENCE TO RELATED APPLICATIONS

This application is a continuation application of U.S. patent application Ser. No. 15/683,823, filed Aug. 23, 2017, which claims the benefit of U.S. Provisional Patent Application Ser. No. 62/470,172, filed Mar. 10, 2017, and U.S. Provisional Patent Application Ser. No. 62/518,071, filed Jun. 12, 2017.

BRIEF DESCRIPTION OF DRAWINGS

FIG. 2E is a blade hardware block diagram, showing a control plane, compute and storage planes, and authorities interacting with underlying physical resources, in accordance with some embodiments.

DESCRIPTION OF EMBODIMENTS

Figure 1A:
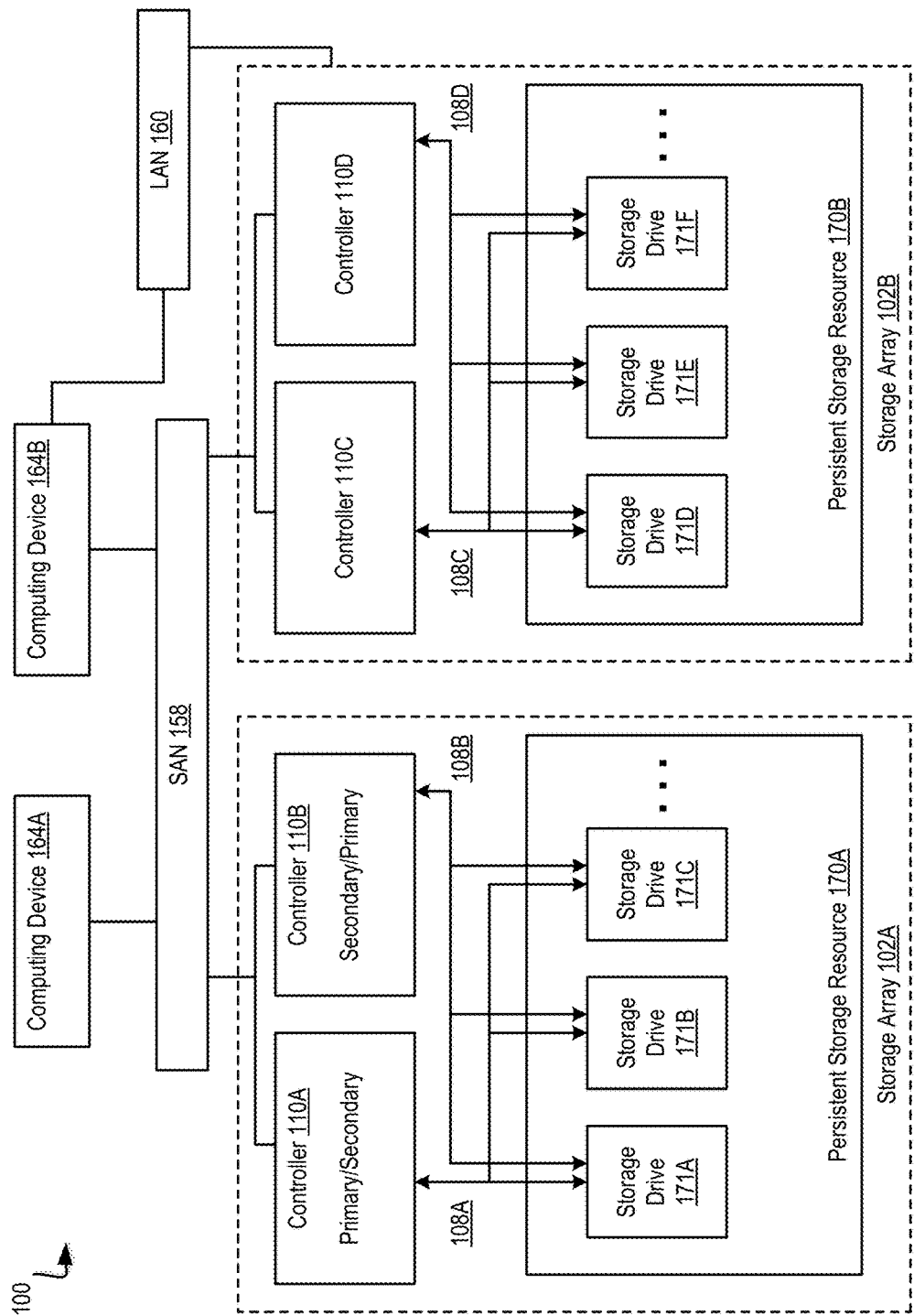
FIG. 1A illustrates a first example system for data storage in accordance with some implementations.

Example methods, apparatus, and products for managing host definitions across a plurality of storage systems in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('IAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol (IF), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller (e.g., storage array controller 110A) of a storage system 100 may be designated with primary status (also referred to as "primary controller" herein), and other storage array controllers (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
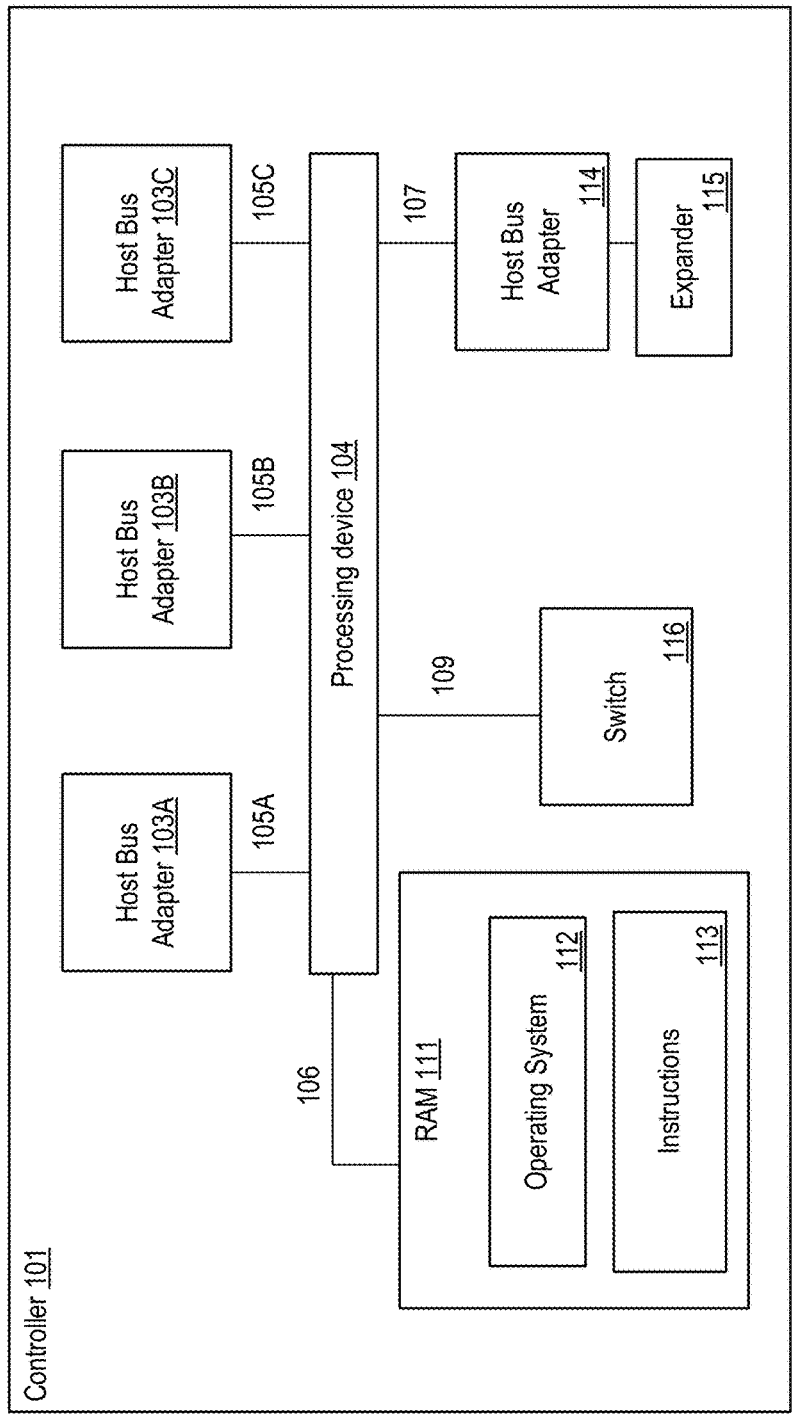
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an application specific integrated circuit ('ASIC'), a field programmable gate array ('FPGA'), a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
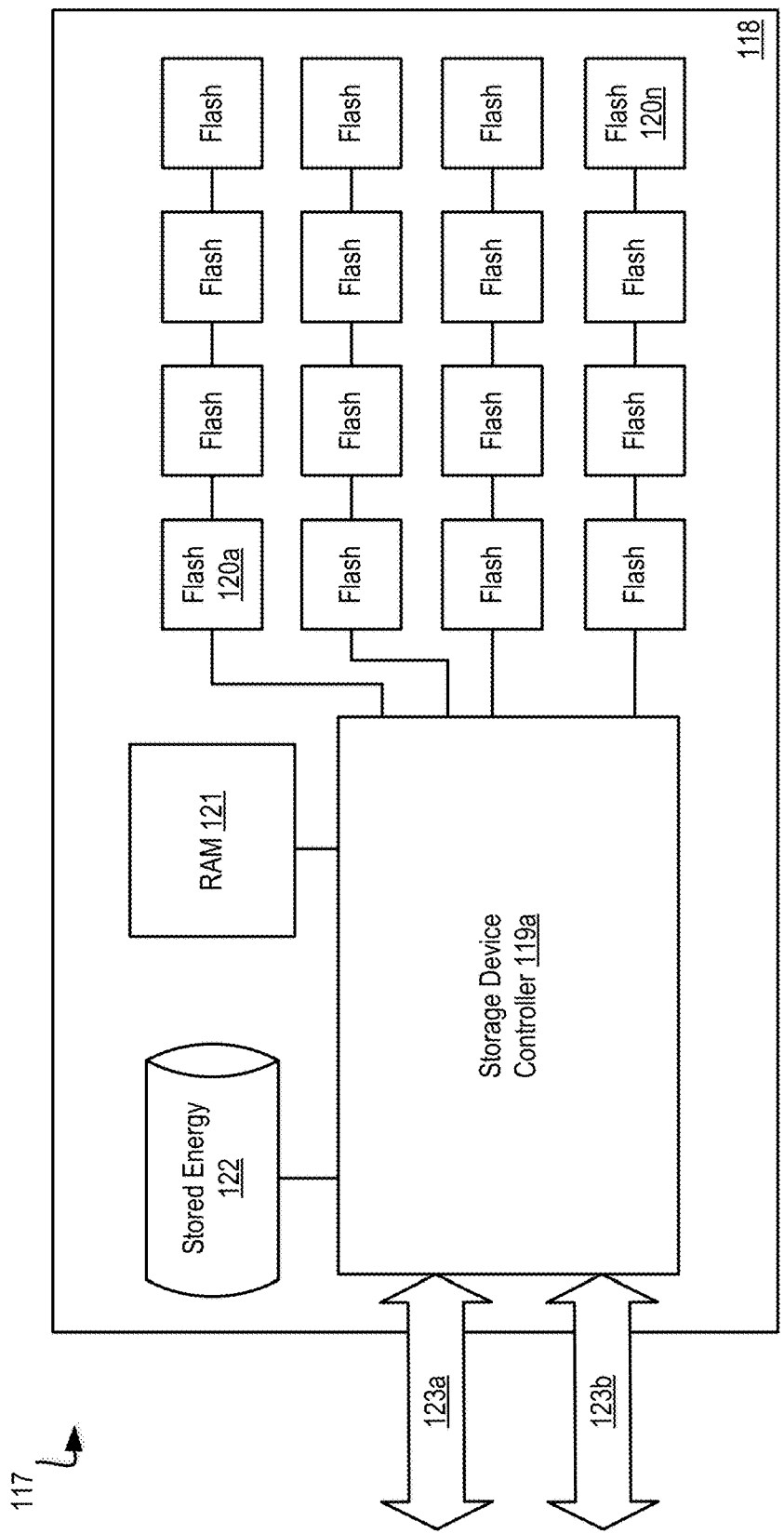
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage device controller 119a-d. In one embodiment, storage device controller 119a-d may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119a-d. Flash memory devices 120a-n, may be presented to the controller 119a-d as an addressable collection of Flash pages, erase blocks, and/or control elements sufficient to allow the storage device controller 119a-d to program and retrieve various aspects of the Flash. In one embodiment, storage device controller 119a-d may perform operations on flash memory devices 120A-N including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119a-d or multiple storage device controllers. The RAM 121 may be utilized for other purposes as well, such as temporary program memory for a processing device (e.g., a CPU) in the storage device controller 119a-d.

In one embodiment, system 117 may include a stored energy device 122, such as a rechargeable battery or a capacitor. Stored energy device 122 may store energy sufficient to power the storage device controller 119a-d, some amount of the RAM (e.g., RAM 121), and some amount of Flash memory (e.g., Flash memory 120a-120n) for sufficient time to write the contents of RAM to Flash memory. In one embodiment, storage device controller 119a-d may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119a-d from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119a-d may present a logical device over a PCI bus which may include an addressable fast-write logical device, or a distinct part of the logical address space of the Dual PCI storage device 118, which may be presented as PCI memory or as persistent storage. In one embodiment, operations to store into the device are directed into the RAM 121. On power failure, the storage device controller 119a-d may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a Dual PCI storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 107a-120n stored energy device 122 may power storage device controller 119a-d and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119a-d. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
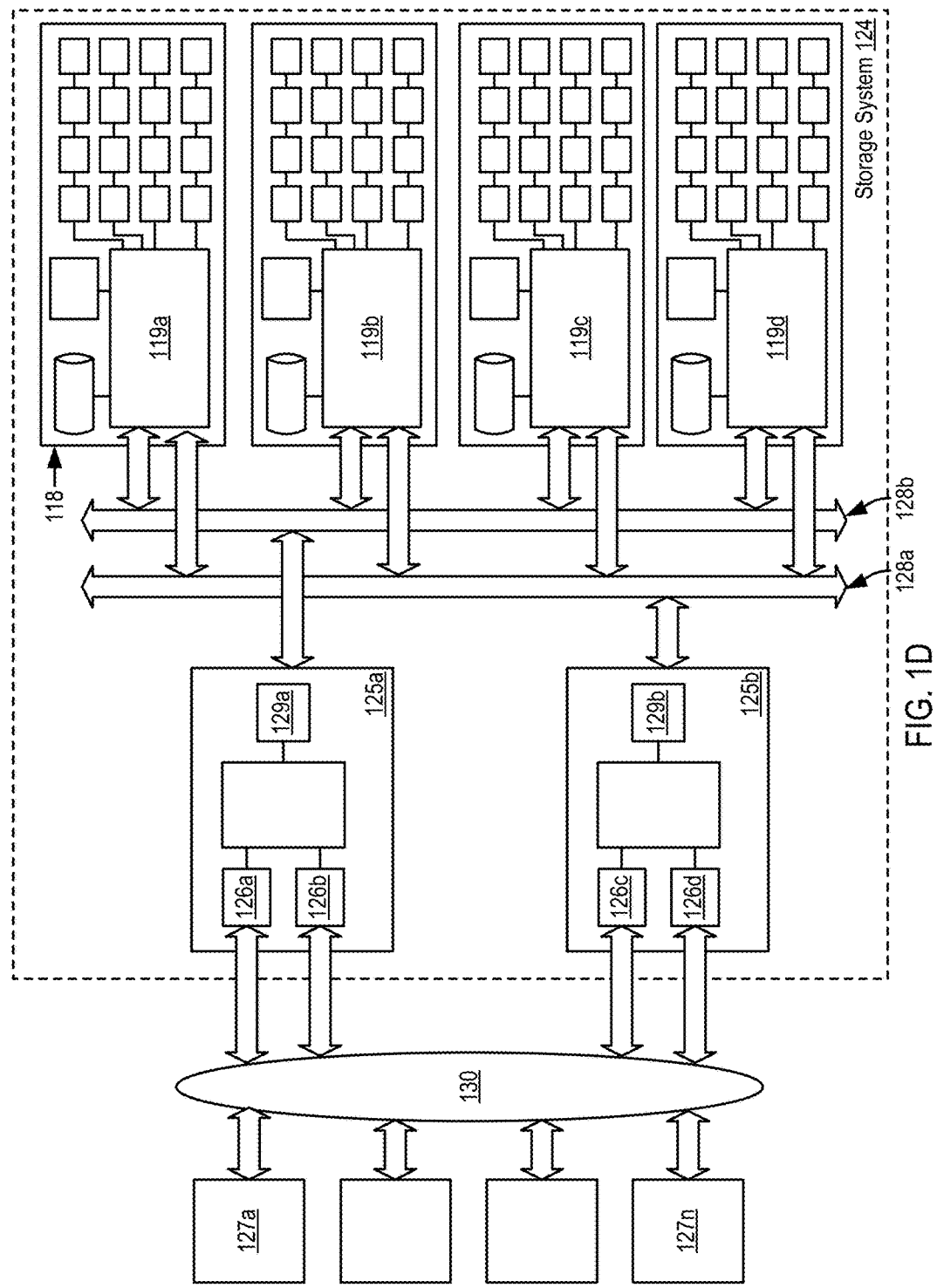
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage device controllers 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a-d may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119a-d may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
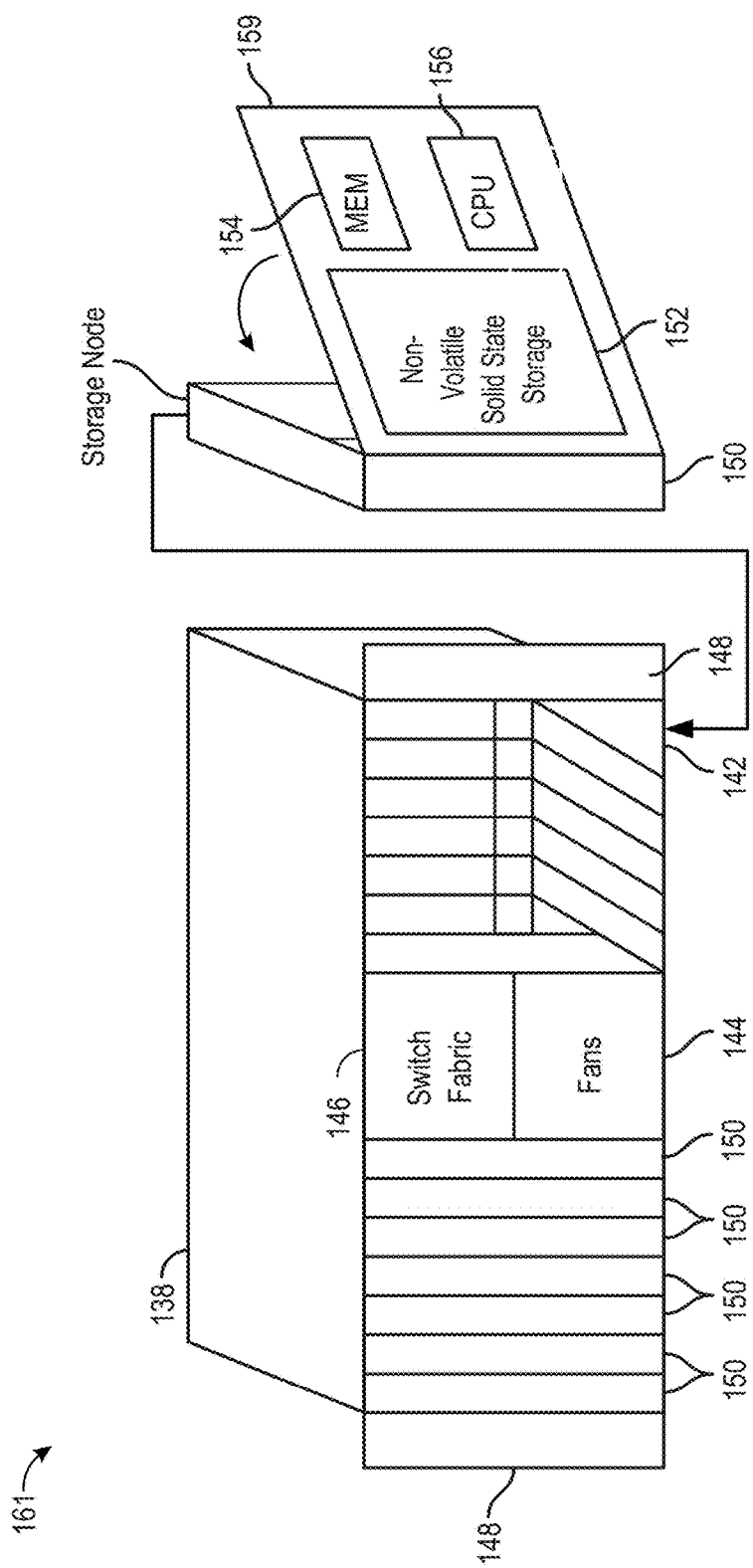
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
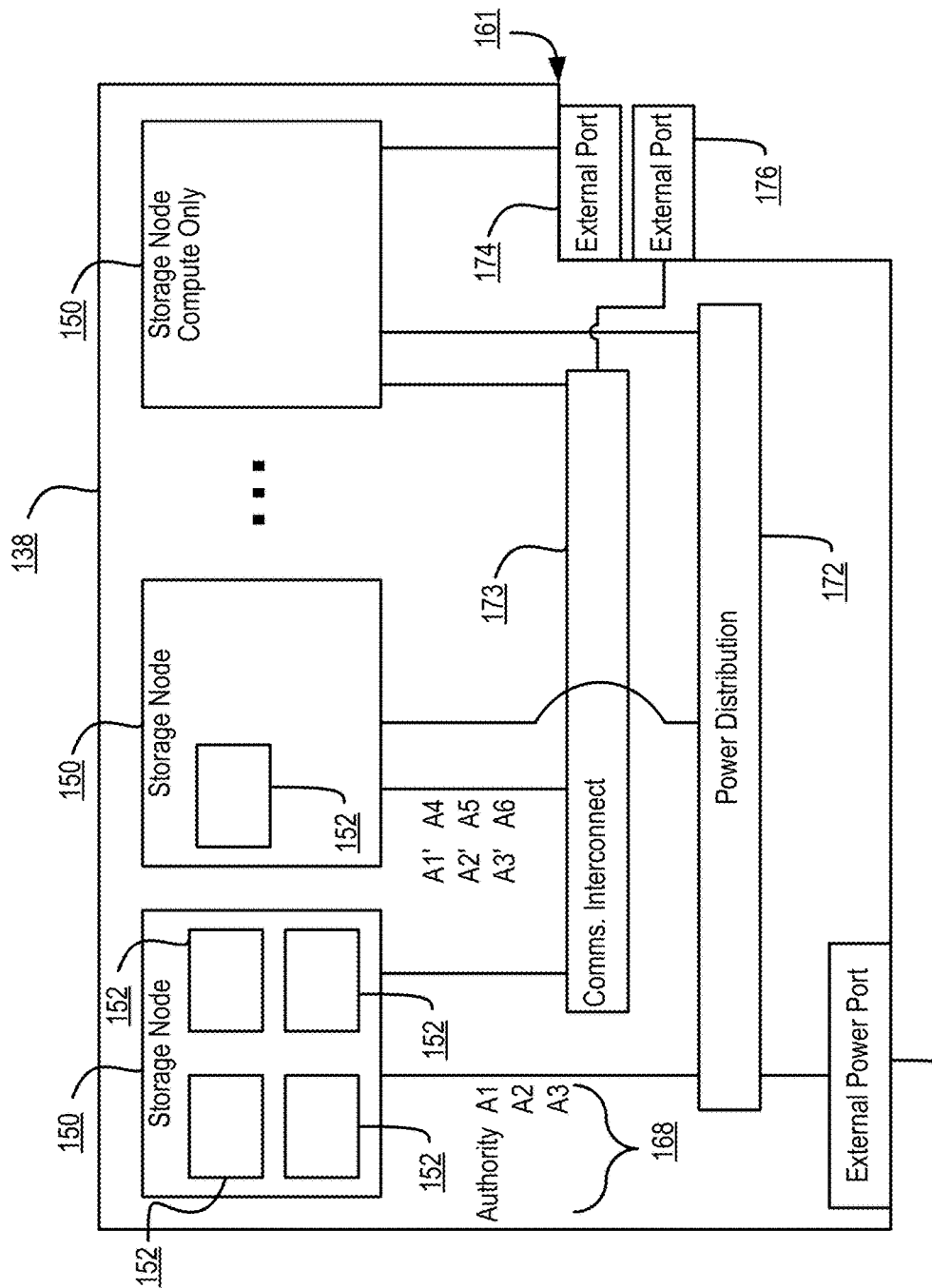
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
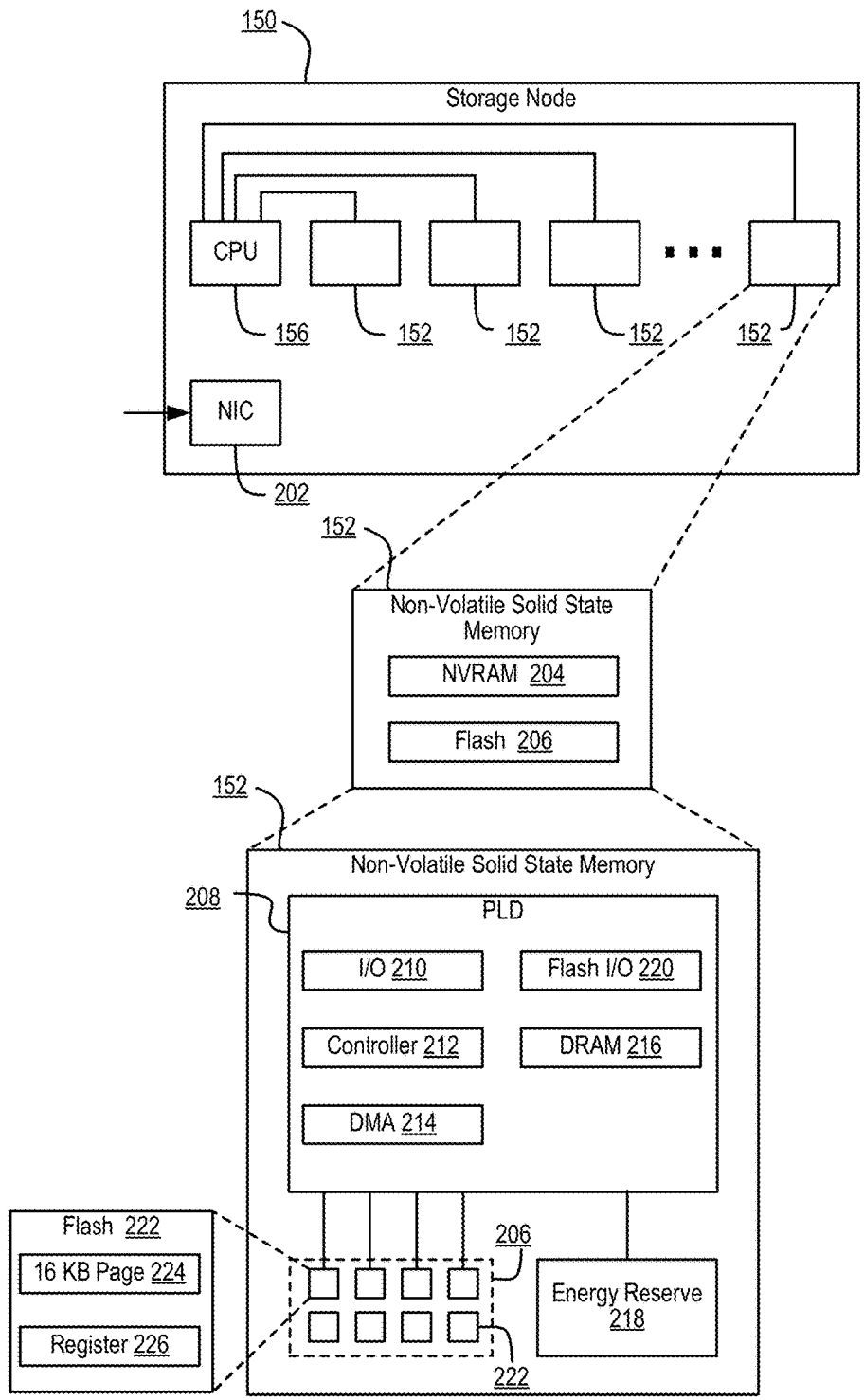
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
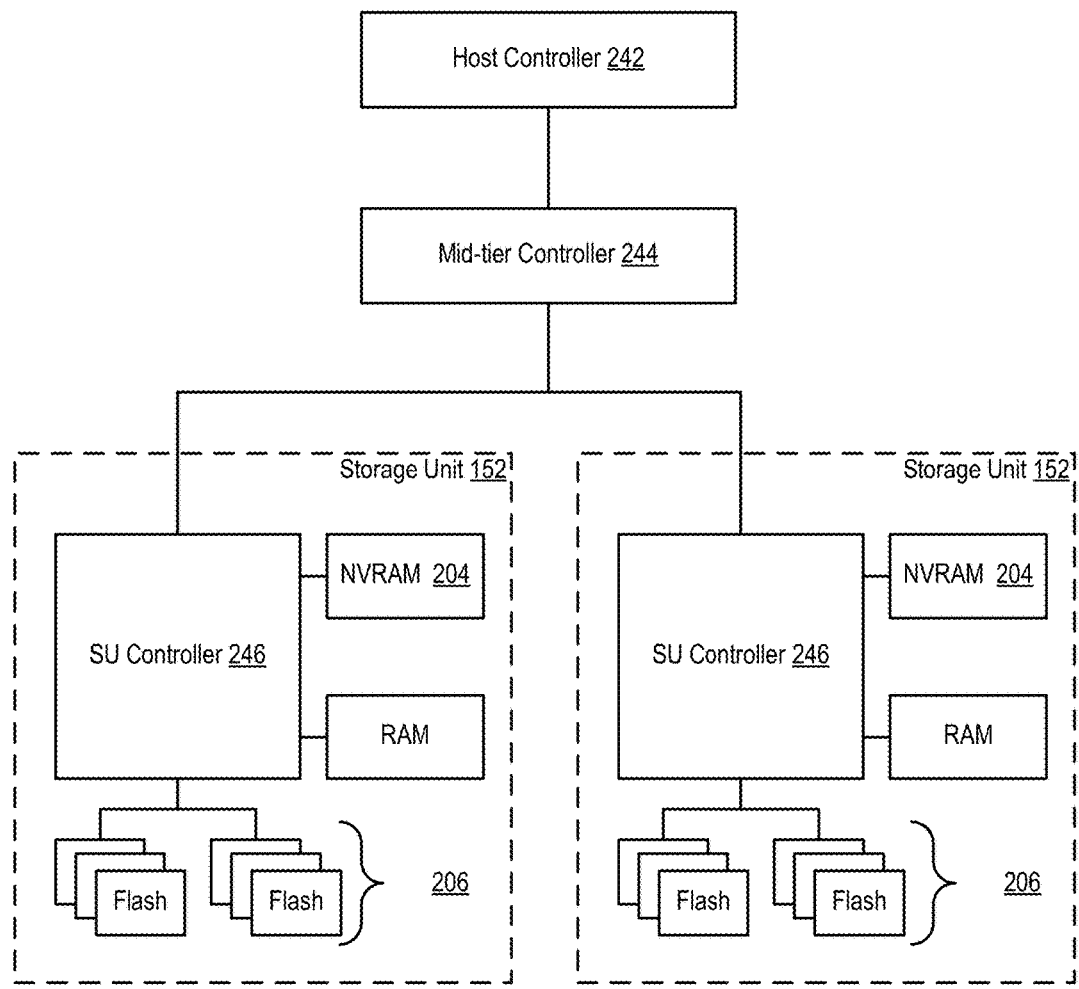
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA (field programmable gate array), flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources.

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
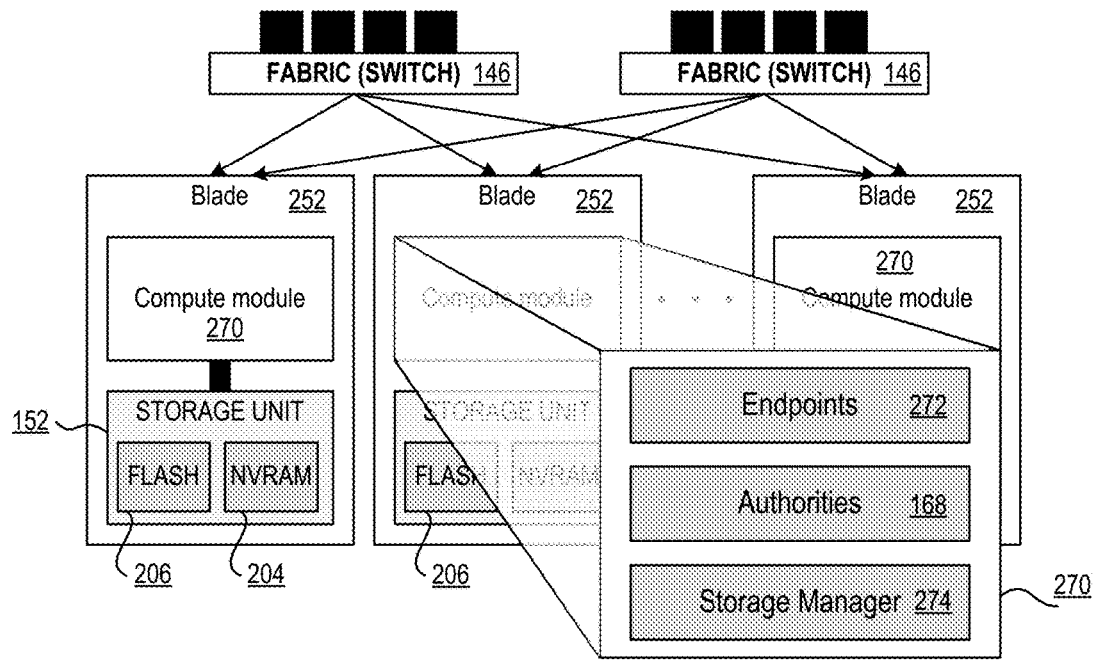
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
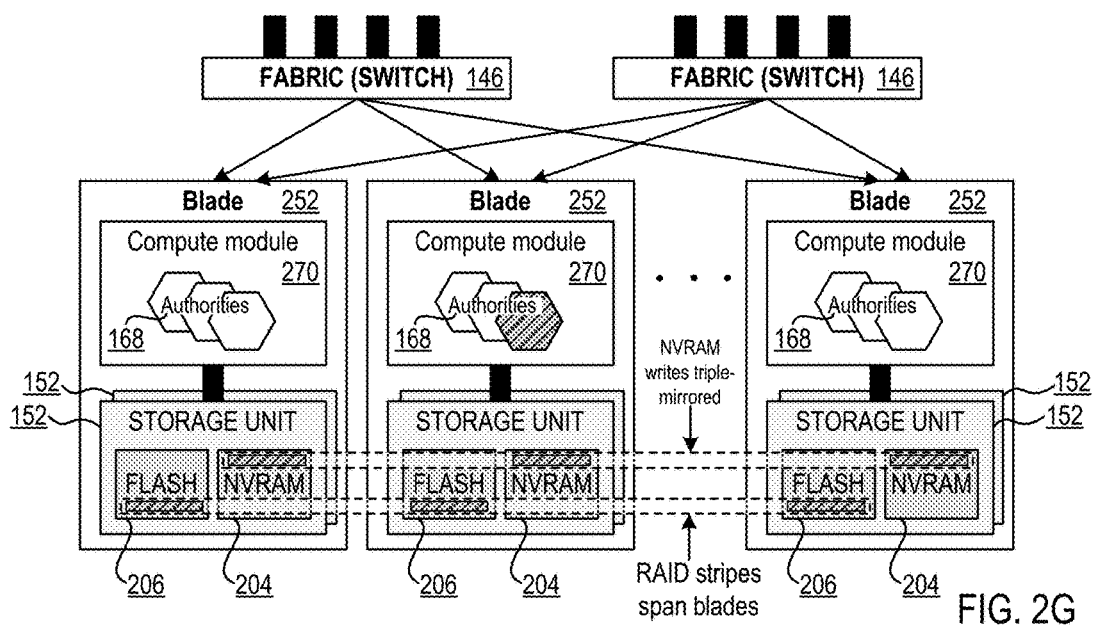
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
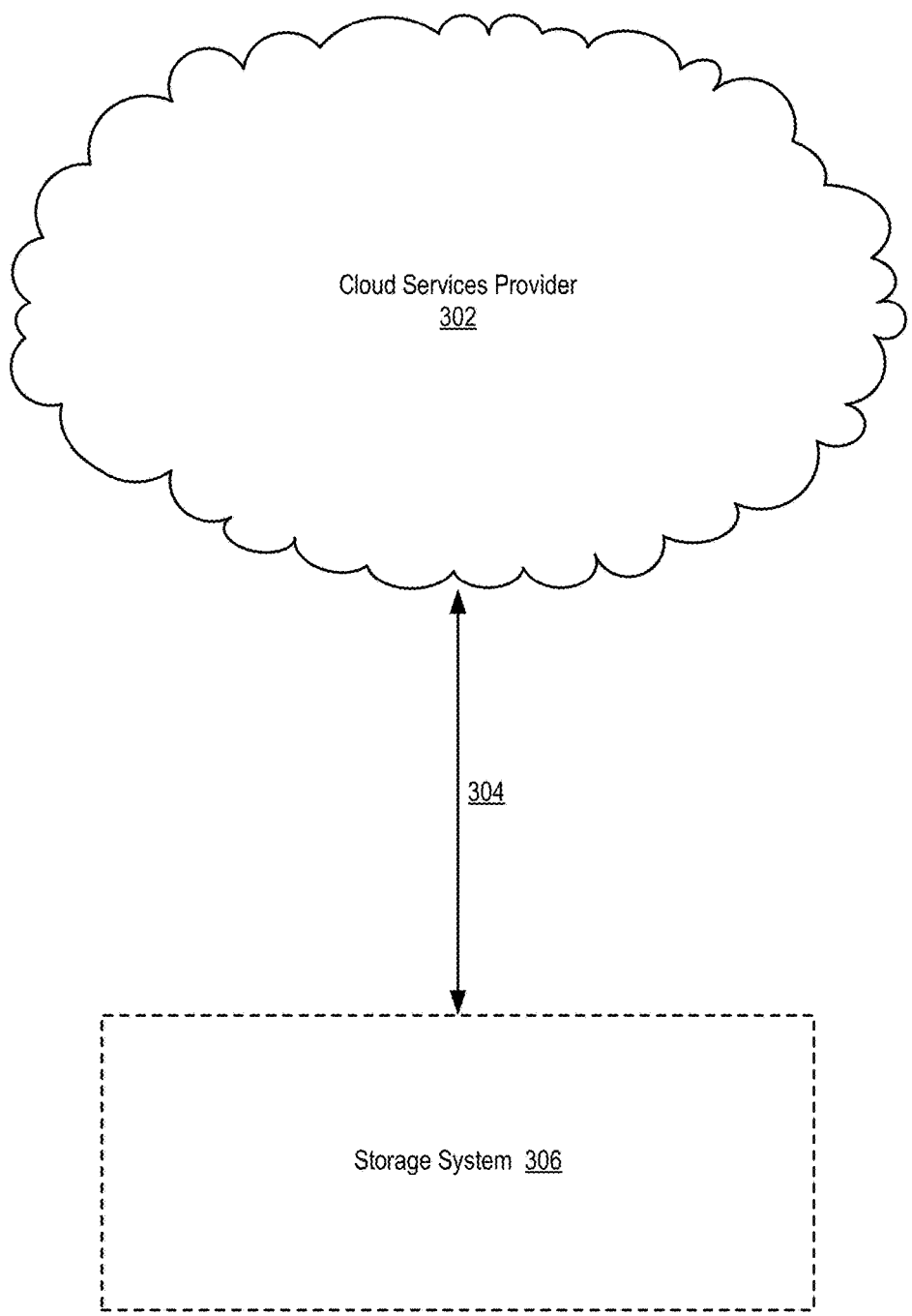
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or local area network ('LAN'), or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services to the storage system 306 and users of the storage system 306 through the implementation of an infrastructure as a service ('IaaS') service model where the cloud services provider 302 offers computing infrastructure such as virtual machines and other resources as a service to subscribers. In addition, the cloud services provider 302 may be configured to provide services to the storage system 306 and users of the storage system 306 through the implementation of a platform as a service ('PaaS') service model where the cloud services provider 302 offers a development environment to application developers. Such a development environment may include, for example, an operating system, programming-language execution environment, database, web server, or other components that may be utilized by application developers to develop and run software solutions on a cloud platform. Furthermore, the cloud services provider 302 may be configured to provide services to the storage system 306 and users of the storage system 306 through the implementation of a software as a service ('SaaS') service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. The cloud services provider 302 may be further configured to provide services to the storage system 306 and users of the storage system 306 through the implementation of an authentication as a service ('AaaS') service model where the cloud services provider 302 offers authentication services that can be used to secure access to applications, data sources, or other resources. The cloud services provider 302 may also be configured to provide services to the storage system 306 and users of the storage system 306 through the implementation of a storage as a service model where the cloud services provider 302 offers access to its storage infrastructure for use by the storage system 306 and users of the storage system 306. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. Public cloud and private cloud deployment models may differ and may come with various advantages and disadvantages. For example, because a public cloud deployment involves the sharing of a computing infrastructure across different organization, such a deployment may not be ideal for organizations with security concerns, mission-critical workloads, uptime requirements demands, and so on. While a private cloud deployment can address some of these issues, a private cloud deployment may require on-premises staff to manage the private cloud. In still alternative embodiments, the cloud services provider 302 may be embodied as a mix of a private and public cloud services with a hybrid cloud deployment.

Although not explicitly depicted in FIG. 3A, readers will appreciate that additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive telemetry data phoned home by the storage system 306. Such telemetry data may describe various operating characteristics of the storage system 306 and may be analyzed, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
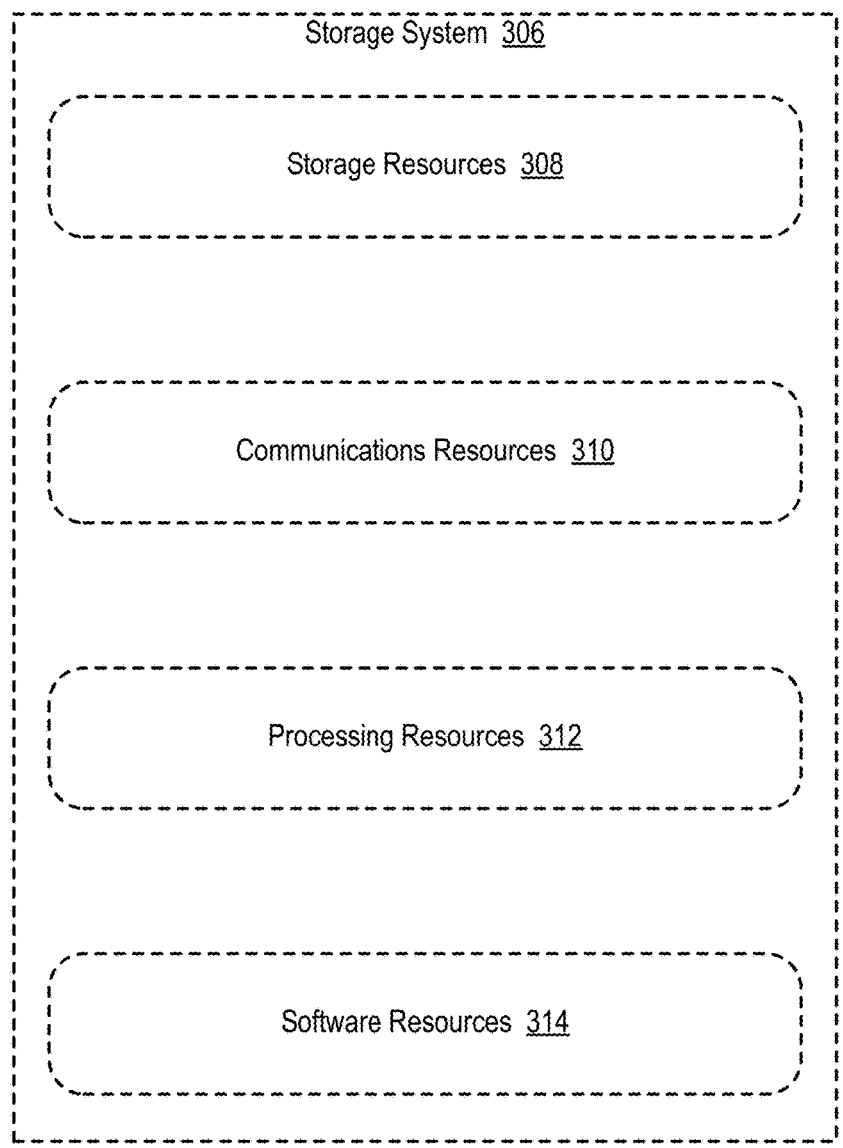
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include storage resources 308, which may be embodied in many forms. For example, in some embodiments the storage resources 308 can include nano-RAM or another form of nonvolatile random access memory that utilizes carbon nanotubes deposited on a substrate. In some embodiments, the storage resources 308 may include 3D crosspoint nonvolatile memory in which bit storage is based on a change of bulk resistance, in conjunction with a stackable cross-gridded data access array. In some embodiments, the storage resources 308 may include flash memory, including single-level cell ('SLC') NAND flash, multi-level cell ('MLC') NAND flash, triple-level cell ('TLC') NAND flash, quad-level cell ('QLC') NAND flash, and others. In some embodiments, the storage resources 308 may include non-volatile magnetoresistive random-access memory ('MRAIVI'), including spin transfer torque ('STT') MRAM, in which data is stored through the use of magnetic storage elements. In some embodiments, the example storage resources 308 may include non-volatile phase-change memory ('PCM') that may have the ability to hold multiple bits in a single cell as cells can achieve a number of distinct intermediary states. In some embodiments, the storage resources 308 may include quantum memory that allows for the storage and retrieval of photonic quantum information. In some embodiments, the example storage resources 308 may include resistive random-access memory ('ReRAM') in which data is stored by changing the resistance across a dielectric solid-state material. In some embodiments, the storage resources 308 may include storage class memory ('SCM') in which solid-state nonvolatile memory may be manufactured at a high density using some combination of sub-lithographic patterning techniques, multiple bits per cell, multiple layers of devices, and so on. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC networks. The communications resources 310 can also include FC over ethernet ('FCoE') technologies through which FC frames are encapsulated and transmitted over Ethernet networks. The communications resources 310 can also include InfiniBand ('IB') technologies in which a switched fabric topology is utilized to facilitate transmissions between channel adapters. The communications resources 310 can also include NVM Express ('NVMe') technologies and NVMe over fabrics ('NVMeoF') technologies through which non-volatile storage media attached via a PCI express ('PCIe') bus may be accessed. The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more application-specific integrated circuits ('ASICs') that are customized for some particular purpose as well as one or more central processing units ('CPUs'). The processing resources 312 may also include one or more digital signal processors ('DSPs'), one or more field-programmable gate arrays ('FPGAs'), one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform various tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques. Through the use of such data protection techniques, business continuity and disaster recovery objectives may be met as a failure of the storage system may not result in the loss of data stored in the storage system.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Readers will appreciate that the various components depicted in FIG. 3B may be grouped into one or more optimized computing packages as converged infrastructures. Such converged infrastructures may include pools of computers, storage and networking resources that can be shared by multiple applications and managed in a collective manner using policy-driven processes. Such converged infrastructures may minimize compatibility issues between various components within the storage system 306 while also reducing various costs associated with the establishment and operation of the storage system 306. Such converged infrastructures may be implemented with a converged infrastructure reference architecture, with standalone appliances, with a software driven hyper-converged approach, or in other ways.

Readers will appreciate that the storage system 306 depicted in FIG. 3B may be useful for supporting various types of software applications. For example, the storage system 306 may be useful in supporting artificial intelligence applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, and many other types of applications by providing storage resources to such applications.

Figure 4:
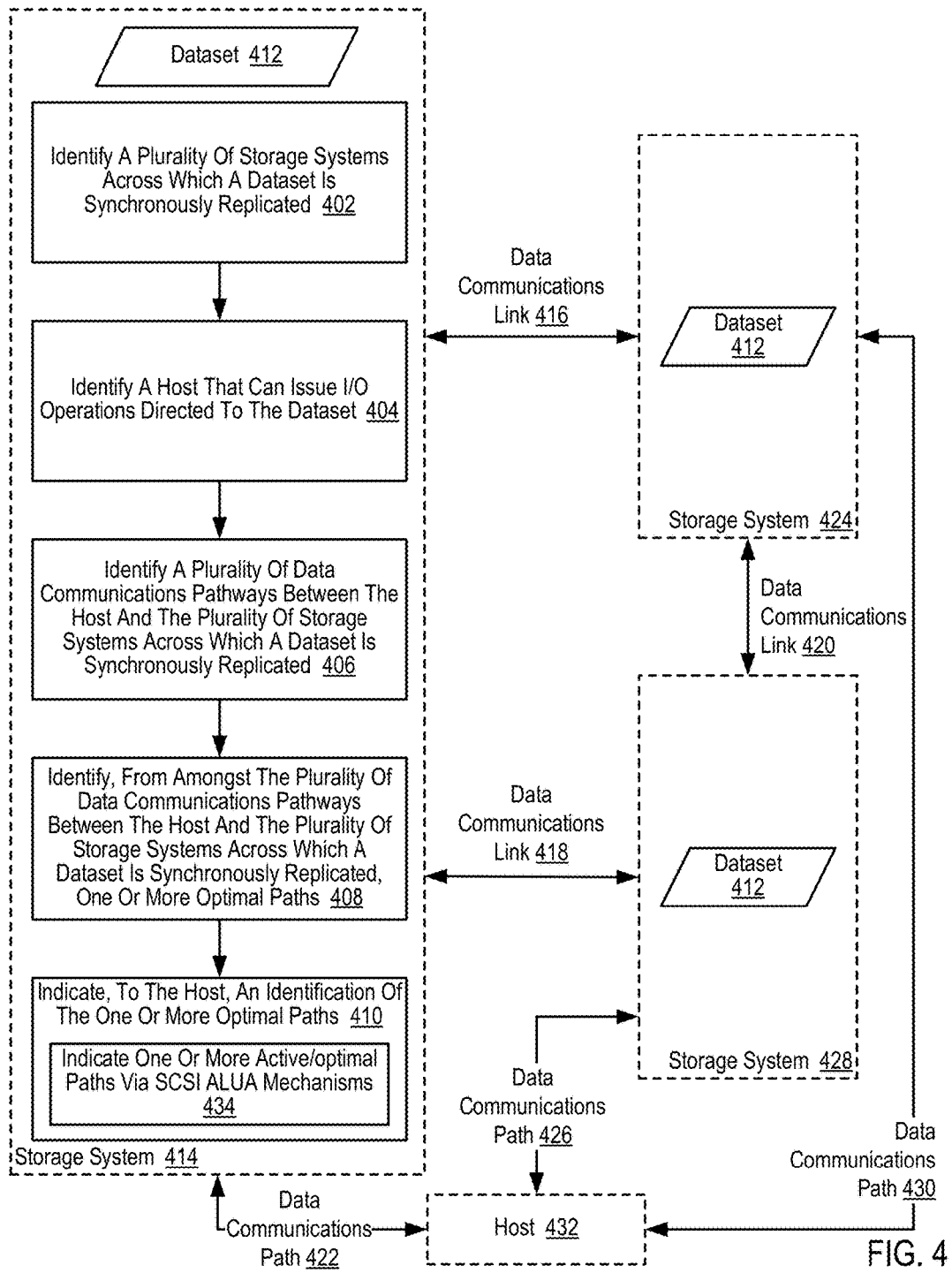
FIG. 4 sets forth a flow chart illustrating an example method for managing connectivity to synchronously replicated storage systems according to some embodiments of the present disclosure.

For further explanation, FIG. 4 sets forth a flow chart illustrating an example method for managing connectivity to synchronously replicated storage systems (414, 424, 428) according to some embodiments of the present disclosure. Although depicted in less detail, the storage systems (414, 424, 428) depicted in FIG. 4 may be similar to the storage systems described above with reference to FIGS. 1A-1D, FIGS. 2A-2G, FIGS. 3A-3B, or any combination thereof. In fact, the storage system depicted in FIG. 4 may include the same, fewer, additional components as the storage systems described above.

The example method depicted in FIG. 4 includes identifying (402) a plurality of storage systems (414, 424, 428)

across which a dataset (412) is synchronously replicated. The dataset (412) depicted in FIG. 4 may be embodied, for example, as the contents of a particular volume, as the contents of a particular shard of a volume, or as any other collection of one or more data elements. The dataset (412) may be synchronized across a plurality of storage systems (414, 424, 428) such that each storage system (414, 424, 428) retains a local copy of the dataset (412). In the examples described herein, such a dataset (412) is synchronously replicated across the storage systems (414, 424, 428) in such a way that the dataset (412) can be accessed through any of the storage systems (414, 424, 428) with performance characteristics such that any one storage system in the cluster doesn't operate substantially more optimally than any other storage system in the cluster, at least as long as the cluster and the particular storage system being accessed are running nominally. In such systems, modifications to the dataset (412) should be made to the copy of the dataset that resides on each storage system (414, 424, 428) in such a way that accessing the dataset (412) on any of the storage systems (414, 424, 428) will yield consistent results. For example, a write request issued to the dataset must be performed on all storage systems (414, 424, 428) or performed on none of the storage systems (414, 424, 428). Likewise, some groups of operations (e.g., two write operations that are directed to same location within the dataset) must be executed in the same order, or as if they were executed in the same order, on all storage systems (414, 424, 428) such that the copy of the dataset that resides on each storage system (414, 424, 428) is ultimately identical on all storage systems (414, 424, 428). Modifications to the dataset (412) need not be made at the exact same time, but some actions (e.g., issuing an acknowledgement that a write request directed to the dataset, enabling read access to a location within the dataset that is targeted by a write request that has not yet been completed on all storage systems) may be delayed until the copy of the dataset (412) on each storage system (414, 424, 428) has been modified.

In contrast to the treatment of write requests (or other requests to modify the dataset that is synchronously replicated across a plurality of storage systems), other types of requests may be serviced locally by the storage system that received the request, with no distributed messaging increasing latency of such operations. For example, a read request, query request, or other request that does not result in a modification of the dataset (412) can be processed locally by the storage system which received the request, usually with no distributed messaging increasing latency of such operations. For example, if a host issues a read request to a first storage system (414) within a cluster of storage systems (414, 424, 428) across which the dataset (412) is synchronously replicated, then an implementation can ensure that there will typically be no inline messaging between the storage systems (414, 424, 428) that is required to complete the read request, yielding read latency that is frequently identical to the latency of a local non-replicated storage system. In some instances, such operations (e.g., a read request) may be blocked within an implementation by conflicting write requests (i.e., a request to write data to a portion of the dataset that overlaps with the portion of the data set that is to be read in response to the read request) or other form of conflicting modifying operation that have not yet completed on all of the storage systems (414, 424, 428). A block may be necessary, for example, to preserve ordering requirements for multiple read requests that overlap in time with one or more concurrent modifying requests. Such a block can be used to ensure that a first read on one storage system that is concurrent with a write or other modifying operation on the same or another storage system in the pod, and where the first read is followed by a second read on another storage system in the pod that also overlaps the same write or other modifying operation, will never return the results of the modifying operation for the first read while returning the content from prior to the modifying operation for the second read. A block of overlapping read requests for in-flight modifying operations that a storage system has learned about, and that have not yet been processed everywhere in the pod, can assure that this reverse time order for read operations will not happen by delaying read requests that might return the results from an overlapping modifying operation until all other overlapping read requests are also assured to return results from that overlapping modifying operation.

In the example method depicted in FIG. 4, identifying (402), for a dataset (412), a plurality of storage systems (414, 424, 428) across which the dataset (412) will be synchronously replicated may be carried out, for example, by examining a pod definition or similar data structure that associates a dataset (412) with one or more storage systems (414, 424, 428) which nominally store that dataset (412). A 'pod', as the term is used here and throughout the remainder of the present application, may be embodied as a management entity that represents a dataset, a set of managed objects and management operations, a set of access operations to modify or read the dataset, and a plurality of storage systems. Such management operations may modify or query managed objects equivalently through any of the storage systems, where access operations to read or modify the dataset operate equivalently through any of the storage systems. Each storage system may store a separate copy of the dataset as a proper subset of the datasets stored and advertised for use by the storage system, where operations to modify managed objects or the dataset performed and completed through any one storage system are reflected in subsequent management objects to query the pod or subsequent access operations to read the dataset. Additional details regarding a 'pod' may be found in previously filed provisional patent application No. 62/518,071, which is incorporated herein by reference. Storage systems can be added to a pod, resulting in the pod's dataset (412) being copied to that storage system and then kept up to date as the dataset (412) is modified. Storage systems can also be removed from a pod, resulting in the dataset (412) being no longer kept up to date on the removed storage system. In such examples, a pod definition or similar data structure may be updated as storage systems are added to and removed from a particular pod.

The example method depicted in FIG. 4 also includes identifying (404) a host (432) that can issue I/O operations directed to the dataset (412). The host (432) depicted in FIG. 4 may be embodied, for example, as an application server running externally to the storage systems (414, 424, 428), or as any other device that issues access requests (e.g., read, writes) to the storage systems (414, 424, 428) via one or more data communications paths. Identifying (404) a particular host (432) that can issue I/O operations directed to the dataset (412) may be carried out, for example, by one or more of the storage systems (414, 424, 428) retaining a list or other data structure that includes an identification of each host from which the storage system (414, 424, 428) has received an I/O operation that is directed to the dataset (412), by examining a list or other data structure that identifies each host that has the appropriate permissions necessary to access the dataset (412), or in some other way.

The example method depicted in FIG. 4 also includes identifying (406) a plurality of data communications paths (422, 426, 430) between the host (432) and the plurality of storage systems (414, 424, 428) across which a dataset (412) is synchronously replicated. Each data communications path (422, 426, 430) between the host (432) and the plurality of storage systems (414, 424, 428) may represent a relationship between a host initiator port and storage system target port, between a network interface on a host and a network interface on a storage system, and so on. In such an example, there may be several host initiator ports and several storage system target ports, and the storage system can also contain several storage controllers each of which may host multiple target ports. Target ports or network interfaces on separate storage systems, even if in the same pod, should normally be distinct from each other. Target ports may be managed using Target Port Groups, which are groups of ports associated with a storage system volume that share a common state with respect to Active/Optimized, Active/Unoptimized, Standby, and Offline. A Target Port Group may be associated with each storage controller of an individual storage system rather than being associated with a storage system as a whole. In fact, a Target Port Group can be entirely arbitrary, including being associated with a subset of target ports even within a single storage controller. A storage system could also use host initiator information in constructing or informing Target Port Groups, though it will have to provide this information consistently (at least per volume) to each host initiator to ensure there is no confusion in the multi-pathing driver stack. In the example method depicted in FIG. 4, identifying (406) a plurality of data communications paths (422, 426, 430) between the host (432) and the plurality of storage systems (414, 424, 428) across which a dataset (412) is synchronously replicated may be carried out, for example, through the use of the SCSI Asymmetric Logical Unit Access ('ALUA') mechanisms that are described in greater detail in the following paragraph, through the use of some other network discovery tools, or in some other way.

The example method depicted in FIG. 4 also includes identifying (408), from amongst the plurality of data communications paths (422, 426, 430) between the host (432) and the plurality of storage systems (414, 424, 428) across which a dataset (412) is synchronously replicated, one or more optimal paths. The storage system depicted in FIG. 4 may identify (408) one or more optimal paths from amongst the plurality of data communications paths (422, 426, 430) between the host (432) and the plurality of storage systems (414, 424, 428) across which a dataset (412) is synchronously replicated and storage communications endpoints associated with the storage systems. In the example method depicted in FIG. 4, identifying (408) one or more optimal paths may include identifying a single optimal path or identifying a plurality of optimal paths. For example, a subset of more optimal paths (such as the paths between the host and a particular storage system) may be identified where any path that meets various performance thresholds may be identified, a predetermined number of the most optimal paths (e.g., those paths that exhibit superior performance relative to other available paths) may be identified, a predetermined percentage of the most optimal paths may be identified, and so on. Readers will appreciate that there may be performance advantages associated with the host (432) issuing I/O operations to one storage system versus another storage system, as the storage systems (414, 424, 428) may be located some distance from each other, the storage systems (414, 424, 428) may be located in separate storage networks or separate parts of storage networks, or for some other reason. For example, there may be performance advantages associated with the host (432) issuing I/O operations to a storage system that is physically located within the same data center or campus as the host (432) relative to the host (432) issuing I/O operations to a storage system that is physically located within a distant data center or campus. For reliability purposes it may be beneficial to have the host (432) retain connectivity to all storage systems (432), but for performance purposes it may be preferred that the host (432) accesses the dataset (412) through a particular storage system. Readers will appreciate that because different hosts may access the dataset (412), the one or more optimal paths for one host to access the dataset (412) may be different than the one or more optimal paths for another host to access the dataset (412). In some embodiments, it is possible that two storage systems are sufficiently similar that paths to both storage systems may be viewed as being optimal. For example, if two storage systems are in the same data center or campus and have abundant networking between a host and those two storage systems, while a third storage system may be sufficiently distant that it should not be used except as a fallback, the paths between the host and the two sufficiently similar storage systems may all be candidates for being identified (408) as the optimal path.

In the example method depicted in FIG. 4, identifying (408), from amongst the plurality of data communications paths (422, 426, 430) between the host (432) and the plurality of storage systems (414, 424, 428) across which a dataset (412) is synchronously replicated, one or more optimal paths may be carried out, for example, through the use of the SCSI ALUA mechanisms. The SCSI ALUA mechanisms are described in the SCSI SPC-4 and SBC-3 technical standards as a set of commands and inquiries that describe support for asymmetric access to storage system volumes from through multiple target ports to a storage volume (also known in SCSI as a "logical unit"). In such an embodiment, a volume (whose content may represent a dataset that is synchronously replicated across a plurality of storage systems) can report a unique ID to the host (432) through multiple SCSI target ports associated with one or more target port groups, such that the host (432), through one or more SCSI host ports, can configure its I/O drivers to access the volume through some or all combinations of its host ports and the advertised target ports. The unique volume ID can be used by the host (432) I/O drivers to recognize all the SCSI logical unit number, host port, and target port combinations that access the same volume. The host I/O drivers can then issue SCSI commands down several, any, or all of those combinations (paths) to modify the state and content of an identified volume. Faults can result in the host re-issuing requests down alternate paths and performance considerations may result in the host (432) making substantial use of multiple paths to get benefits of improved host-to-storage-system bandwidth through the use of multiple ports and multiple network interconnects.

With the ALUA specifications for SCSI, multiple target port groups can be described that can access a volume, each of which can each be assigned a state. A target port group can represent one or more SCSI target ports on a storage system. In a multi-controller storage system, a target port group might represent all SCSI target ports on one controller, or with symmetrically accessible synchronously replicated storage systems, a target port group might represent all SCSI target ports on an individual storage system, or target ports might be grouped in some other way. The state that can be associated with a target port group indicates whether the port group should be preferred for issuing I/O (Active/

Optimized), non-preferred for issuing I/O (Active/Non-optimized), standby (I/Os cannot be issued until there is a change in state back to Active/Optimized or Active/Non-optimized), or the target port group can be offline such as due to being unresponsive. The SCSI specification allows the definition of target port groups and ALUA target port group assigned states to be specific to each requesting host (or even each requesting host port), as well as specific to each volume, so that for each volume, a storage system can present a unique set of target port groups and target port group assigned states to each host or host port that can access that volume.

With symmetrically accessible synchronously replicated storage systems, all storage systems in a pod can present the same volumes out to hosts as if the all storage systems in the pod were, to the host, one storage system presenting the same volumes out through SCSI target ports on several or all storage systems for the pod. These mechanisms can then provide all the capabilities desired for directing and redirecting access to volumes in a pod. For hosts which get better performance (such as due to network or geographical proximity of the host to that storage system) to a particular storage system for a pod, the ALUA target port group assigned state for that storage system to that host's host ports can be indicated as Active/Optimized, while for other hosts that get lesser performance to that particular storage system for the pod, the ALUA target port group assigned state for the storage system to that other other's host ports can be indicated as Active/Non-optimized. In such a way, members of a target port group that is determined to be Active/Optimized may be identified (408) to hosts as the optimal path(s).

If new storage systems are added to a pod, then new target port groups can be added for each volume in that pod to the host ports accessing that volume, with target port groups assigned states appropriate to the host/storage-system proximity for the new storage system. After some number of SAN-level events, the host can recognize the new ports for each volume and configure its drivers to use the new paths appropriately. The storage system can monitor for host accesses (such as waiting for REPORT LUNS and INQUIRY commands) to determine on behalf of the pod that a host is now properly configured to use SCSI target ports on the newly added storage system. If a storage system is removed from a pod, then other storage systems that remain in the pod can stop reporting any target ports or target port groups for the removed storage system for the pod's volumes to any host ports. Further, the removed storage system can stop listing the pod's volumes in any REPORT LUN request, and the storage system can start reporting that a volume doesn't exist in response to commands to the pod's volumes. If a volume is moved into or out of a pod, resulting in a volume being associated with an expanded or reduced set of storage systems, the same actions can be applied to the individual volume that would have been applied in adding or removing a storage system from a pod. As for handling faults, the host I/O drivers will access their volumes through target ports in a target port group that is assigned as Active/Optimized if any such paths are available and functioning properly, but can switch to Active/Non-optimized paths if no Active/Non-optimized paths are available and functioning properly.

In the example method depicted in FIG. 4, identifying (408), from amongst the plurality of data communications paths (422, 426, 430) between the host (432) and the plurality of storage systems (414, 424, 428) across which a dataset (412) is synchronously replicated, one or more optimal paths may also be carried out, for example, in an automated manner by using timing or network information to determine that host paths to particular interfaces or storage systems in a pod has lower latency, better throughput, or less switching infrastructure than host paths to other particular interfaces or storage systems in the pod. In such an example, identifying (408), from amongst the plurality of data communications paths (422, 426, 430) between the host (432) and the plurality of storage systems (414, 424, 428) across which a dataset (412) is synchronously replicated, one or more optimal paths may therefore include identifying one or more data communications pathways that exhibit the relatively lowest latencies between the host and one of the storage systems, identifying one or more data communications pathways that exhibit the latency between the host and one of the storage systems that is below a predetermined threshold, and so on.

On an IP based network, for example, ping and traceroute commands (or directly utilizing their underlying ICMP Echo requests) may be used to determine the latency and network routes between known host network interfaces and the network interfaces for storage systems in a pod. A traceroute facility, or direct use of ICMP Echo requests with a gradually increasing TTL field (to limit the number of network hops before a router sends an ICMP Time Exceeded response), can be used to determine that there is a particular network hop that has a higher latency, or to determine that there is no such network hop. In this case, a host interface to storage interface route with a high latency hop can be avoided in favor of host interface to storage interface routes without a high latency hop. Alternately, if there is a network route that has fewer hops than another and has low latency, the storage system with that network interface can be preferred.

On a Fibre Channel based network, the HBA API specification and plug-in libraries as supported by the Storage Networking Industry Association from their Fibre Channel Working Group, can be used to map out a FC storage network. Also, the ELS Echo feature in Fibre Channel protocol can be used to detect network latencies. As with IP networks described previously, this can be used to identify host port to target port networks with lower latency and fewer network hops than other host port and target port combinations, which can be used to determine which storage systems in a pod are closer or better connected to one host or another, for purposes of configuring storage systems in the pod for Active/Optimized versus Active/Non-optimal for each host.

The example method depicted in FIG. 4 also includes indicating (410), to the host (432), an identification of the one or more optimal paths. In the example method depicted in FIG. 4, a storage system (414, 424, 428) may indicate (410) an identification of the optimal path to the host (432), for example, through one or more messages exchanged between the storage system (414, 424, 428) and the host (432). Such messages may be exchanged using many of the mechanisms described above and may identify the optimal path through the use of a port identifier, network interface identifier, or some other identifier. For example, indicating (410), to the host (432), an identification of the one or more optimal paths may be carried out by indicating (434), to the host (432), one or more Active/Optimized paths via SCSI ALUA mechanisms.

Readers will appreciate that the storage systems (414, 424, 428) described herein may utilize host definitions to define a host (432) as a named set of ports or network interfaces, where those host definitions may include additional connection-related information or additional characteristics such as operating system or application type or workload categorization. Host definitions can be given a name for administrative convenience, and can be represented as first-class objects in storage system user interfaces, or they can be grouped together in various ways, such as to list all hosts associated with a particular application, user, or host-based database or file system cluster. These host definitions can serve as convenient administrative objects for a storage system to associate information about host location or for host to storage system preferences for pods. It may be convenient for a storage system to manage one host definition for each host rather than one host definition for each pod. That may be convenient because the initiator ports and network interfaces associated with a host are likely the same for all pods. This might not be the case if pods are used as a strong form of virtual appliance where each pod is securely isolated from other pods, however, this may be convenient and easier to set up for any uses or implementations that are short of such secure pod isolation.

If pods can provision a dataset or a storage object to the same host from multiple storage systems in the pod, and if the ALUA states for that host and the host to storage system preferences must be managed in a coordinated fashion across all storage systems for the pod, then host definitions may need to be coordinated or synchronized across pods, but unlike most other administered objects for a pod, the host may be a storage system object (because network interfaces and SCSI target ports are often storage system objects) rather than a pod object. As a result, the host object may not be as readily synchronized between pod members because definitions may clash.

In addition, a host may be interconnected to one storage system for a pod through one set of host-side initiators and network interfaces, and to another storage system for a pod through a different set of host-side initiators and network interfaces. Furthermore, there may be some overlap between the two sets, or there may be no overlap between the two sets. In some cases, there may be host information that can be used by storage systems to determine that interfaces represent the same host. For example, the interfaces may use the same iSCSI IQN, or a host-side driver may supply host information to the storage systems to indicate that the various initiator or network interfaces represent the same host. In other cases, there may be no such information. In the absence of discoverable information, parameters for host definitions may instead be supplied to a storage system by a user or through some API or other interface to relate a host name to a set of network endpoints, iSCSI IQNs, initiator ports, and so on.

If part of a dataset associated with a pod is exported to a particular host through a host definition (meaning that it is provided to a host based on a host definition through a list of network endpoints, iSCSI IQNs, or initiator ports from one or more of a pod's current storage systems' own network endpoints, and SCSI targets), then when an additional storage system is added to the pod, the added storage system's host definitions can be examined. If no host with the same host object name, and no host with an overlapping list of host network endpoints, iSCSI IQNs, or initiator ports is present on the added storage system, then the host definition can be copied to the added storage system. If a host definition with the same name and the same configuration of host network endpoints, iSCSI IQNs, and initiator ports is present on the added storage system, then the host definition from the original pod member storage systems and that of the added storage system can be linked and coordinated from then on. If a host with the same name but a differing configuration of host network endpoints, iSCSI IQNs, or initiator ports is present on the added storage system, then qualified versions of the host objects can be exchanged between the storage systems for the pod, where differing versions are named with a storage system qualifier. For example, storage system A may present its host definition as A:H1, while storage system B may present its host definition as B:H1. The same can be provided for host definitions that differ in name but have some overlap in host network endpoints, iSCSI IQNs, or initiator ports. In that case, the host definitions may not be copied between storage systems but may instead stay storage system local, yielding, for example, a host definition A:H1 listing host initiators X and Y, and a host definition B:H2 listing host initiators Y and X. Further, an operation can be provided to synchronize these host definitions. If two host definitions have the same name, or an overlapping set of host network endpoints, iSCSI IQNs, or initiator ports, then a user can be provided with a simple interface for unifying them together with a common name, exchanged host network endpoints, iSCSI IQNs or initiator ports, that are then linked together. If the only clash between the two definitions is that some host definitions include host interfaces that aren't listed on another interface, but at least one host interface matches, then these definitions could be automatically merged and linked rather than waiting for a user to make such a request.

If a storage system in a pod detaches another storage system as a result of a set of conditions (faults, shutdowns, etc.), then the detached storage system, if it is offline for the pod but is otherwise still running, may make changes to its host definition. A storage system which remains online for a pod may also make changes to its host definition. The result can be mismatched host definitions. If the detached storage system is later reconnected to the pod, then the host definitions may no longer match. At that point, the pod may resume reporting host definitions with their storage system name prefix to differentiate the separate definitions on each storage system.

Another aspect of host definitions is that the host definition may define a location or a storage system preference, as part of configuring what will be returned for ALUA information in terms of which storage system's target ports should result in an ALUA status of Active/Optimized and which should result in an ALUA status of Active/Non-optimized. This state may also need to be coordinated and linked between storage systems. If so, that may be another aspect that requires coordination. A clash, or a lack of any setting, detected when reconciling host definitions for storage systems in a pod may also present an opportunity to prompt users to set a location or a storage system preference.

Readers will note that since host definitions may be storage system level objects in practice, rather than pod level objects, the same host definitions can be used for pods stretched between a plurality of storage systems as well as for pods that are not stretched beyond a single storage system. The use of hosts in the context of a purely local pod (or one pod stretched to a different set of storage systems than another pod) could alter how a host (or the list of hosts) is viewed. In the context of a local pod, for example, qualifying a host by a storage system may not make sense, and listing hosts that have no paths to the local storage system may also not make sense. This example could be extended to pods that have different member storage systems. For example, a host definition may clash with a paired storage system for one pod (making storage system qualification useful), while the host definition may not clash with a different paired storage system for a different pod (making storage system qualification potentially unnecessary). A similar issue may arise in the use of hosts when one pod is stretched to one set of additional storage systems and another pod is stretched to a different set of additional storage systems. In that case, only target interfaces for storage systems relevant to a particular pod matter, and only the host network endpoints, iSCSI IQNS, and initiator ports which are visible to the target interfaces on the relevant storage systems for the pod.

Although only one of the storage systems (414, 424, 428) depicted in FIG. 4 is expressly illustrated as performing the steps described above, readers will appreciate that each of the storage systems (414, 424, 428) may be performing the steps described above. In fact, each of the storage systems (414, 424, 428) may be performing the steps described above at roughly the same time, such that the identification of an optimal pathway is a coordinated effort. For example, each storage system (414, 424, 428) may individually identify all data communications pathways between itself and the host, gather various performance metrics associated with each data communications pathways between itself and the host, and share such information with the other storage systems in an effort to identify one or more optimal paths.

Figure 5:
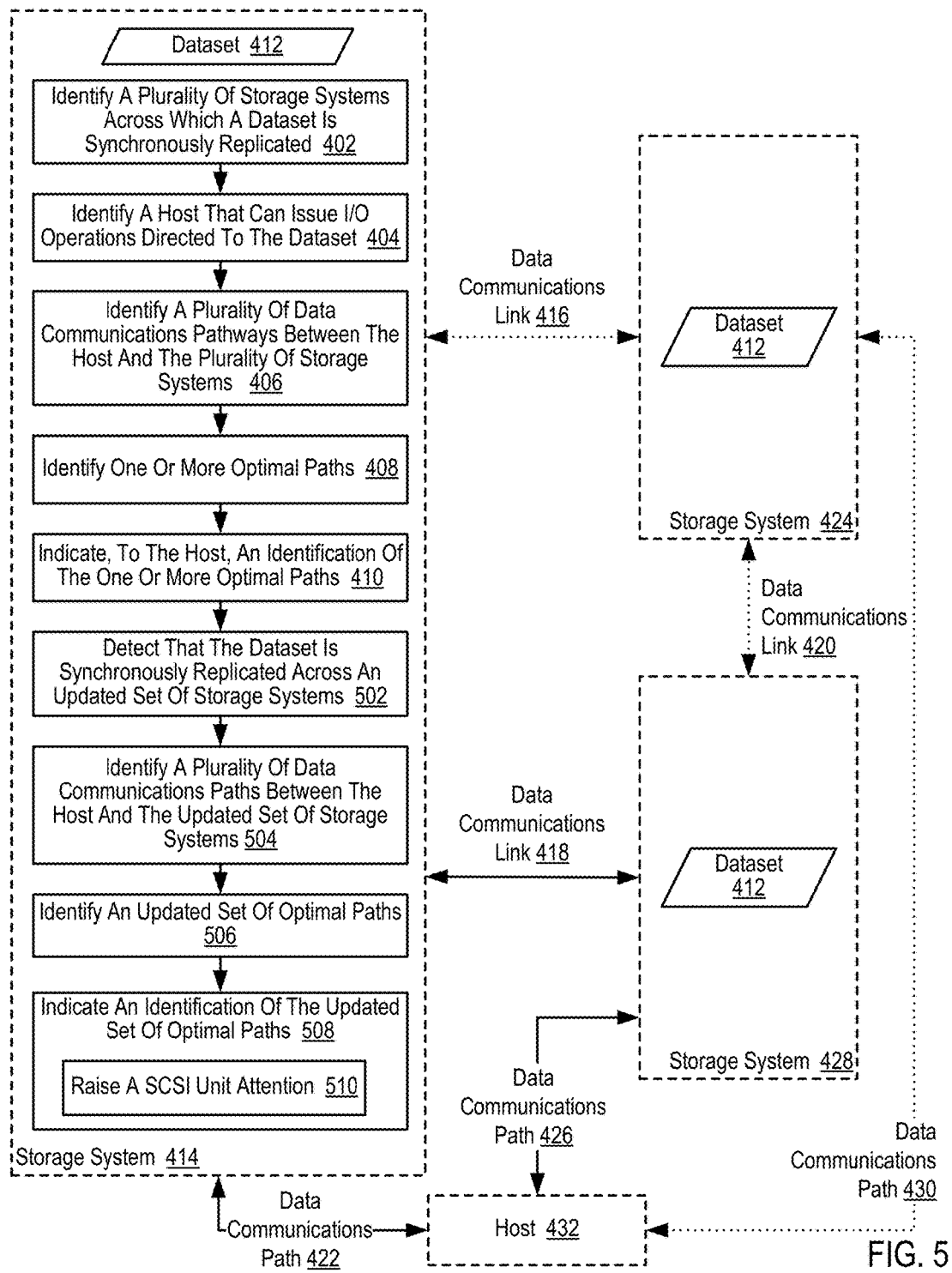
FIG. 5 sets forth a flow chart illustrating an additional example method for managing connectivity to synchronously replicated storage systems according to some embodiments of the present disclosure.

For further explanation, FIG. 5 sets forth a flow chart illustrating an additional example method for managing connectivity to synchronously replicated storage systems (414, 424, 428) according to some embodiments of the present disclosure. Although depicted in less detail, the storage systems (414, 424, 428) depicted in FIG. 5 may be similar to the storage systems described above with reference to FIGS. 1A-1D, FIGS. 2A-2G, FIGS. 3A-3B, or any combination thereof. In fact, the storage system depicted in FIG. 5 may include the same, fewer, or additional components as the storage systems described above.

The example method depicted in FIG. 5 is similar to the example method depicted in FIG. 4, as the example method depicted in FIG. 5 can also include identifying (402) a plurality of storage systems (414, 424, 428) across which a dataset (412) is synchronously replicated, identifying (404) a host (432) that can issue I/O operations directed to the dataset (412), identifying (406) a plurality of data communications paths (422, 426, 430) between the host (432) and the plurality of storage systems (414, 424, 428) across which a dataset (412) is synchronously replicated, identifying (408), from amongst the plurality of data communications paths (422, 426, 430) between the host (432) and the plurality of storage systems (414, 424, 428) across which a dataset (412) is synchronously replicated, one or more optimal paths, and indicating (410), to the host (432), an identification of the one or more optimal paths.

The example method depicted in FIG. 5 also includes detecting (502) that the dataset (412) is synchronously replicated across an updated set of storage systems. In the example method depicted in FIG. 5, the set of storage systems across which the dataset (412) is synchronously replicated may change for a variety of reasons. The set of storage systems across which the dataset (412) is synchronously replicated may change, for example, because one or more properly functioning storage systems are added to or removed from a pod. In addition, the set of storage systems across which the dataset (412) is synchronously replicated may change, for example, because one or more storage systems becomes unreachable or otherwise becomes unavailable and, in response to becoming unreachable or unavailable, is detached from a pod. In the example method depicted in FIG. 5, detecting (502) that the dataset (412) is synchronously replicated across an updated set of storage systems may be carried out, for example, by detecting a change to a pod definition, by detecting that a storage system has becomes unreachable or otherwise becomes unavailable, or in some other way.

In the example method depicted in FIG. 5, an embodiment is depicted where the dataset (412) is synchronously replicated across an updated set of storage systems. In such an example, storage system (424) was described in FIG. 4 as being initially identified (402) as one of the plurality of storage systems (414, 424, 428) across which the dataset (412) is synchronously replicated. The example depicted in FIG. 5, however, illustrates an embodiment in which the storage system (424) has become unreachable or has otherwise become unavailable, which is depicted herein through the use of dotted lines (representing an absence of an active connection) for data communications links (416, 418, 420) between the other storage systems (414, 428) and a data communications path (430) that can be used to couple the host (432) with the storage system (424) for data communications with the storage system (424). As such, the initial set of storage systems across which the dataset (412) was synchronously replicated included all depicted storage systems (414, 424, 428) whereas the updated set of storage systems across which the dataset (412) is synchronously replicated include only two storage systems (414, 428).

The example method depicted in FIG. 5 also includes identifying (504) a plurality of data communications paths between the host (432) and the updated set of storage systems (414, 428). In the example method depicted in FIG. 5, identifying (504) a plurality of data communications paths between the host (432) and the updated set of storage systems (414, 428) may be carried out, for example, through the use of the SCSI ALUA mechanisms that are described in greater detail above, through the use of some other network discovery tools, or in some other way.

The example method depicted in FIG. 5 also includes identifying (506), from amongst the plurality of data communications paths between the host (432) and the updated set of storage systems, an updated set of optimal paths. In the example method depicted in FIG. 5, identifying (506) an updated set of optimal paths may include identifying a single optimal path or identifying a plurality of optimal paths. For example, a subset of more optimal paths (such as the paths between the host and a particular storage system) may be identified where any path that meets various performance thresholds may be identified, a predetermined number of the most optimal paths (e.g., those paths that exhibit superior performance relative to other available paths) may be identified, a predetermined percentage of the most optimal paths may be identified, and so on. Readers will appreciate that there may be performance advantages associated with the host (432) issuing I/O operations to one storage system versus another storage system, as the storage systems (414, 424, 428) may be located some distance from each other, the storage systems (414, 424, 428) may be located in separate storage networks or separate parts of storage networks, or for some other reason. For example, there may be performance advantages associated with the host (432) issuing I/O operations to a storage system that is physically located within the same data center or campus as the host (432) relative to the host (432) issuing I/O operations to a storage system that is physically located within a distant data center or campus. For reliability purposes it may be beneficial to have the host (432) retain connectivity to all storage systems (432), but for performance purposes it may be preferred that the host (432) accesses the dataset (412) through a particular storage system or subset of storage systems. Readers will appreciate that because different hosts may access the dataset (412), the one or more optimal paths for one host to access the dataset (412) may be different than the one or more optimal paths for another host to access the dataset (412). In the example method depicted in FIG. 4, identifying (506), from amongst the plurality of data communications paths between the host (432) and the updated set of storage systems, an updated set of optimal paths may be carried out, for example, through the use of the SCSI ALUA mechanisms described above, in an automated manner by using timing or network information to determine that host paths to particular interfaces or storage systems in a pod has lower latency, better throughput, or less switching infrastructure than host paths to other particular interfaces or storage systems in the pod, or in some other way. Readers will appreciate that although some of the preceding paragraphs refer to a 'set', such a set can include a single member and places no particular limitations as to how such a set is represented.

Readers will appreciate that there may be a variety of sources of the performance advantages described above. For writes, a host requesting writes to a more distant storage system requires long-distance bandwidth for the host-to-distant-storage-system network in addition to the long-distance bandwidth needed (in any case) for the storage-system-to-storage-system replication itself (this uses host-to-storage bandwidth that is otherwise not necessary, or it incurs traffic for write content in both directions when traffic in only one direction should have been necessary). Further, for writes, if long-distance latency is significant, then that latency is incurred four or six times (the first one or three phases of a two or four-phase write from host to distant storage system, plus delivery of write content from the distant storage system to the local storage system, plus delivery of a completion or similar indication from the local storage system to the distant storage system, plus a final completion sent from the distant storage system to the host for the last part of the two or four-phase write request). For writes to the local storage system, by contrast, long distance latency will be incurred only twice: once for delivery of the write content from the local storage system to the distant storage system, and once for delivery of the completion or similar indication from the distant storage system to the local storage system. For reads, a host requesting reads from a local storage system will often consume no long-distance bandwidth at all, and will usually incur no long-distance latency penalty.

The example method depicted in FIG. 5 also includes indicating (508), to the host (432), an identification of the updated optimal path. In the example method depicted in FIG. 5, a storage system (414, 424, 428) may indicate (508) an identification of the updated optimal path to the host (432), for example, through one or more messages exchanged between the storage system (414, 424, 428) and the host (432). Such messages may be exchanged using many of the mechanisms described above and may identify the optimal path through the use of a port identifier, network interface identifier, or some other identifier. Readers will appreciate that in some embodiments, a portion of the process through which a storage system (414, 424, 428) may indicate (508) an identification of the updated optimal path to the host (432) can include piggy-backing such information onto responses to commands issued by the host (432). For example, one of the storage systems (414, 424, 428) may raise (510) a SCSI unit attention to the host. A SCSI unit attention is a mechanism that enables a device (e.g., the storage system) to tell a host-side SCSI driver that the operational state of the device or the fabric state has changed. Stated differently, by raising a unit attention the storage system may indicate to the host that the host should query the storage system for state changes through which the host can find that the target port group states have changed to indicate a different set of Active/Optimized and Active/Non-optimized target port groups. In such an example, the target (e.g., the storage system) internally raises a "unit attention" that is returned to the host (432) the next time a response to a command is sent to the host (432), which tells the host-side SCSI driver to request the updated ALUA state prior to clearing the unit attention. This mechanism may allow the storage system to get the host to update its ALUA state as desired, but it is dependent on a future SCSI request of some kind being issued to some target port which isn't offline. In such an example, because the SCSI protocol takes the form of a command issued by the host (432), and a response returned by the target (e.g., the storage system), transferring information for updating optimal paths may need to piggy-back on this mechanism in a slightly roundabout way, as the SCSI "unit attention" mechanism provides a way for the target to give unsolicited updates back to the host (432).

Figure 6:
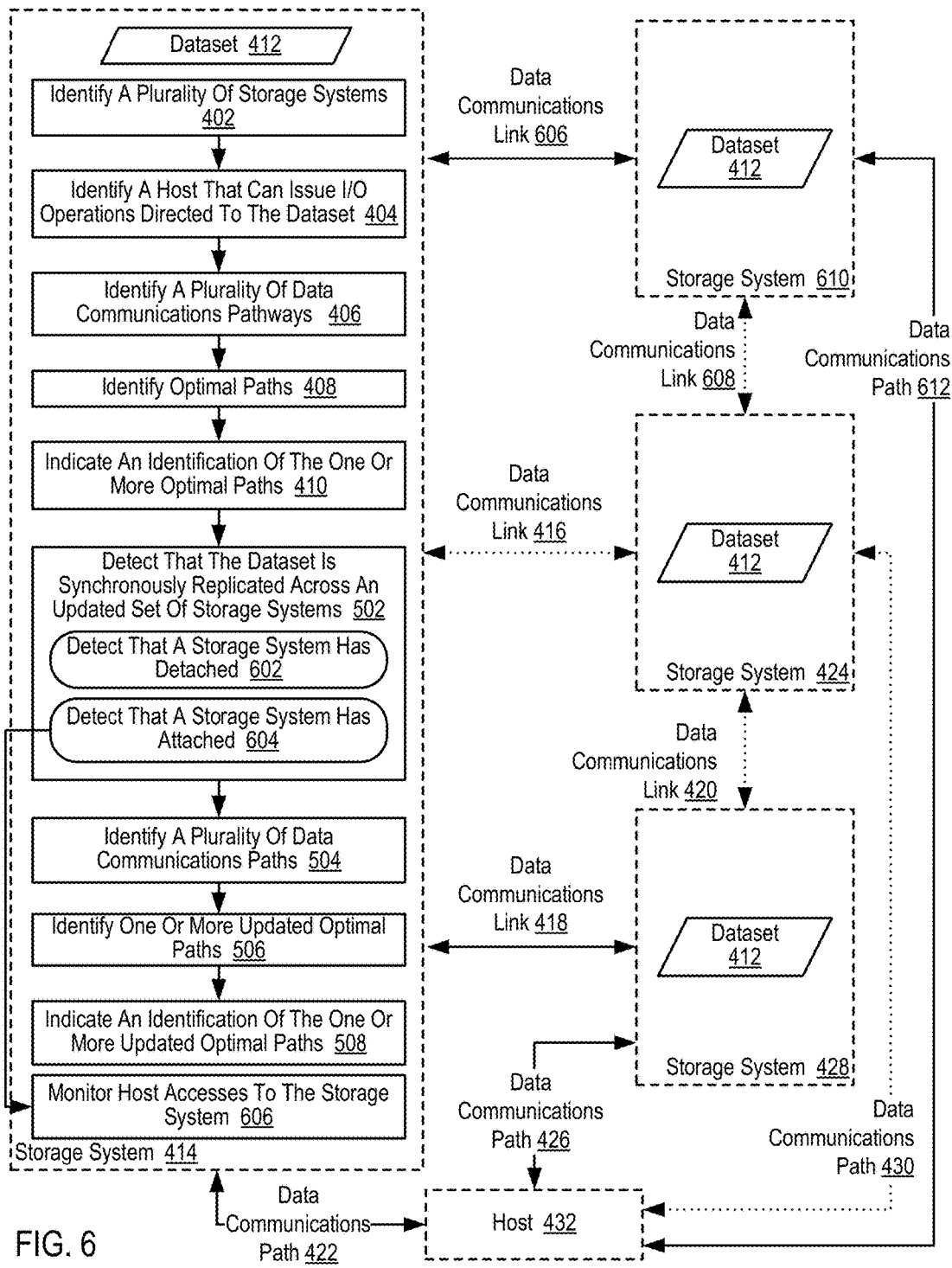
FIG. 6 sets forth a flow chart illustrating an additional example method for managing connectivity to synchronously replicated storage systems according to some embodiments of the present disclosure.

For further explanation, FIG. 6 sets forth a flow chart illustrating an additional example method for managing connectivity to synchronously replicated storage systems (414, 424, 428) according to some embodiments of the present disclosure. Although depicted in less detail, the storage systems (414, 424, 428, 610) depicted in FIG. 6 may be similar to the storage systems described above with reference to FIGS. 1A-1D, FIGS. 2A-2G, FIGS. 3A-3B, or any combination thereof. In fact, the storage system depicted in FIG. 6 may include the same, fewer, additional components as the storage systems described above.

The example method depicted in FIG. 6 is similar to the example methods depicted in FIG. 4 and FIG. 5, as the example method depicted in FIG. 6 can also include identifying (402) a plurality of storage systems (414, 424, 428) across which a dataset (412) is synchronously replicated, identifying (404) a host (432) that can issue I/O operations directed to the dataset (412), identifying (406) a plurality of data communications paths (422, 426, 430) between the host (432) and the plurality of storage systems (414, 424, 428) across which a dataset (412) is synchronously replicated, identifying (408), from amongst the plurality of data communications paths (422, 426, 430) between the host (432) and the plurality of storage systems (414, 424, 428) across which a dataset (412) is synchronously replicated, one or more optimal paths, and indicating (410), to the host (432), an identification of the one or more optimal paths, detecting (502) that the dataset (412) is synchronously replicated across an updated set of storage systems, identifying (504) a plurality of data communications paths between the host (432) and the updated set of storage systems (414, 428), identifying (506), from amongst the plurality of data communications paths between the host (432) and the updated set of storage systems, one or more updated optimal paths, and indicating (508), to the host (432), an identification of the updated optimal path.

In the example method depicted in FIG. 6, detecting (502) that the dataset (412) is synchronously replicated across an updated set of storage systems can include detecting (602) that a storage system (424) has detached from an original set of storage systems across which the dataset (412) was being synchronously replicated. In the example method depicted in FIG. 6, a storage system (424) may be considered 'detached' when the storage system (424) is no longer participating in the synchronous replication of the dataset (412) across a plurality of storage systems. A particular storage system may detach, for example, due to a hardware failure within the storage system, due to a networking failure that prevents the storage system from engaging in data communications, due to a loss of power to the storage system, due to a software crash on the storage system, or for a variety of other reasons. In the example method depicted in FIG. 6, detecting (602) that a storage system (424) has detached from an original set of storage systems across which the dataset (412) was being synchronously replicated may be carried out, for example, by determining that the storage system has become unavailable or otherwise unreachable. In the example method depicted in FIG. 6, one of the storage systems (424) is depicted as being detached due to a networking failure that prevents the storage system from engaging in data communications, as all data communications links (416, 418, 420, 608) and data communications paths (430) that are used by the storage system (424) are represented with dotted lines to illustrate that the data communications links (416, 418, 420, 608) and data communications paths (430) that are used by the storage system (424) are not operational.

In the example method depicted in FIG. 6, detecting (502) that the dataset (412) is synchronously replicated across an updated set of storage systems can also include detecting (604) that a storage system (610) that was not included in an original set of storage systems across which the dataset (412) was being synchronously replicated has attached to the set of storage systems across which the dataset (412) is synchronously replicated. In the example method depicted in FIG. 6, a storage system (610) may be considered 'attached' when the storage system (610) is participating in the synchronous replication of the dataset (412) across a plurality of storage systems. A particular storage system may attach, for example, due to the storage system being added to a pod, due to the storage system recovering from a hardware failure within the storage system, due to the storage system recovering from a networking failure, due to the storage system recovering from a loss of power to the storage system, due to the storage system recovering from a software crash on the storage system, or for a variety of other reasons. In the example method depicted in FIG. 6, one of the storage systems (610) that was not included in any of the previous figures is depicted as being attached to the set of storage systems across which the dataset (412) is synchronously replicated, where the storage system (610) is coupled for data communications with the host (432) and other storage systems (424) via one or more data communications links (606) and data communications paths (612). Readers will appreciate that although no data communications links are illustrated between some of the storage systems (428, 610), such data communications links may actually exist but are only omitted here for convenience of illustration.

The example method depicted in FIG. 6 can also include monitoring (606) host accesses to the storage system (610) that was not included in the original set of storage systems across which the dataset (412) was being synchronously replicated. As described above, if new storage systems are added to a pod, then new target port groups can be added for each volume in that pod to the host ports accessing that volume, with target port groups assigned states appropriate to the host/storage-system proximity for the new storage system. After some number of SAN-level events, the host can recognize the new ports for each volume and configure its drivers to use the new paths appropriately. The storage system can monitor for host accesses (such as waiting for REPORT LUNS and INQUIRY commands) to determine on behalf of the pod that a host is now properly configured to use SCSI target ports on the newly added storage system. In such an example, the host may be monitored for assurance that a host is ready to issue commands to the newly added members of a target port group before taking actions for a pod that depend on the hosts being ready to issue commands to members of that target port group. This may be useful, for example, when coordinating removal of a pod member. In such an example, if one or more hosts that are known to be using the storage system being removed have not yet been found to be using a storage system that was recently added, then if the member being removed is the last remaining storage system known to be working for one or more of those hosts, then it might be beneficial to issue an alert before allowing the operation to proceed (or the operation can be prevented outright).

Figure 7:
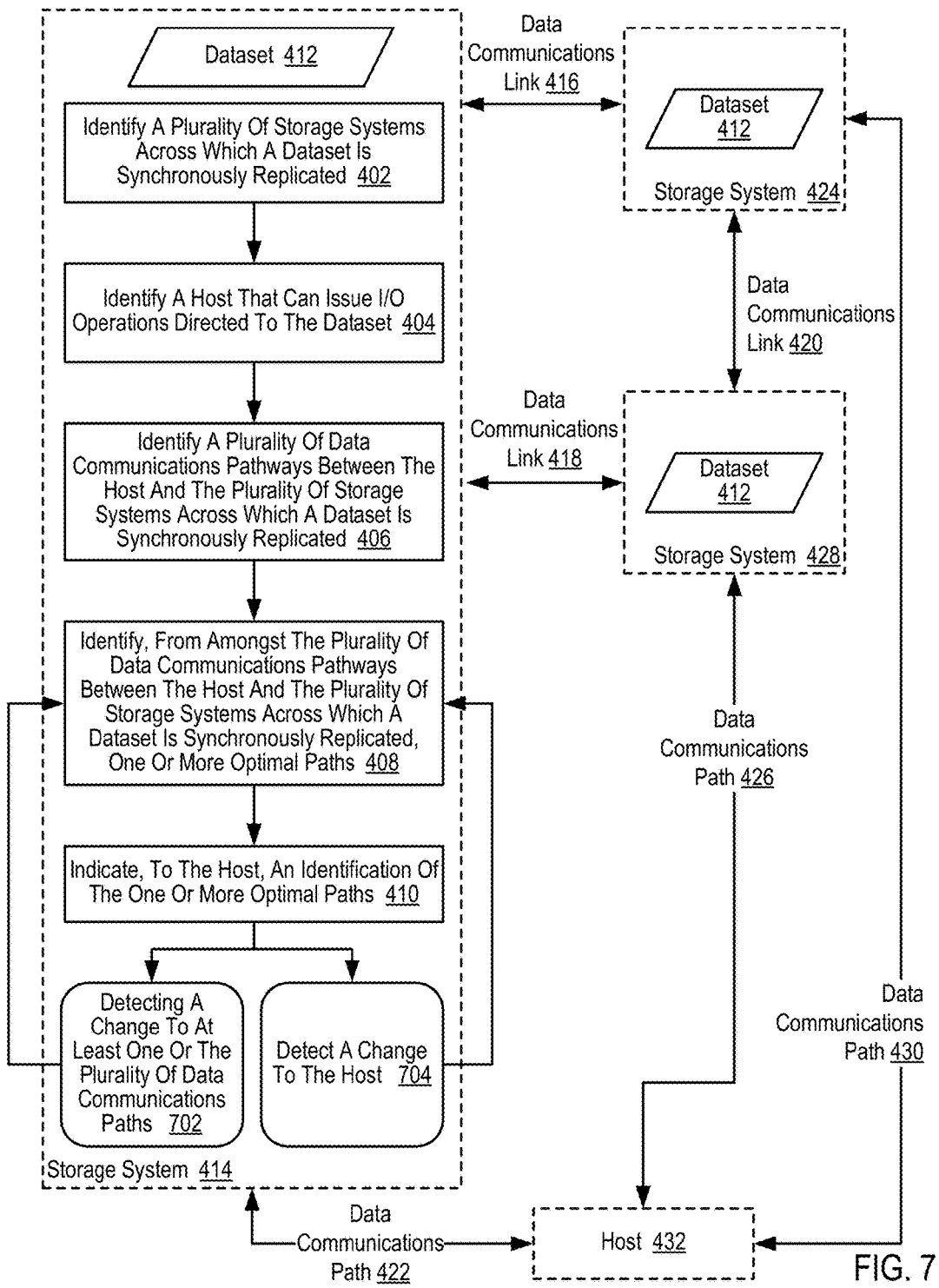
FIG. 7 sets forth a flow chart illustrating an additional example method for managing connectivity to synchronously replicated storage systems according to some embodiments of the present disclosure.

For further explanation, FIG. 7 sets forth a flow chart illustrating an additional example method for managing connectivity to synchronously replicated storage systems (414, 424, 428) according to some embodiments of the present disclosure. Although depicted in less detail, the storage systems (414, 424, 428) depicted in FIG. 7 may be similar to the storage systems described above with reference to FIGS. 1A-1D, FIGS. 2A-2G, FIGS. 3A-3B, or any combination thereof. In fact, the storage system depicted in FIG. 7 may include the same, fewer, additional components as the storage systems described above.

The example method depicted in FIG. 7 is similar to the example methods depicted in FIG. 4, FIG. 5, and FIG. 6, as the example method depicted in FIG. 7 can also include identifying (402) a plurality of storage systems (414, 424, 428) across which a dataset (412) is synchronously replicated, identifying (404) a host (432) that can issue I/O operations directed to the dataset (412), identifying (406) a plurality of data communications paths (422, 426, 430) between the host (432) and the plurality of storage systems (414, 424, 428) across which a dataset (412) is synchronously replicated, identifying (408), from amongst the plurality of data communications paths (422, 426, 430) between the host (432) and the plurality of storage systems (414, 424, 428) across which a dataset (412) is synchronously replicated, one or more optimal paths, and indicating (410), to the host (432), an identification of the one or more optimal paths.

The example method depicted in FIG. 7 also includes detecting (702) a change to at least one or the plurality of data communications paths (422, 426, 430) between the host (432) and the plurality of storage systems (414, 424, 428) across which a dataset (412) is synchronously replicated. Detecting (702) a change to at least one or the plurality of data communications paths (422, 426, 430) between the host (432) and the plurality of storage systems (414, 424, 428) across which a dataset (412) is synchronously replicated may be carried out, for example, by detecting that a particular data communications paths is no longer operational, by determining that the performance (e.g., bandwidth, throughput) across a particular data communications path has changed by more than a predetermined threshold amount, by determining that fewer or additional hops have been introduced to a particular data communications path, and so on. Readers will appreciate that a change to at least one or the plurality of data communications paths (422, 426, 430) between the host (432) and the plurality of storage systems (414, 424, 428) across which a dataset (412) is synchronously replicated may impact which particular data communications path is identified as the optimal path, and as such, the storage systems (414, 424, 428) may need to repeat the steps of identifying (408), from amongst the plurality of data communications paths (422, 426, 430) between the host (432) and the plurality of storage systems (414, 424, 428) across which a dataset (412) is synchronously replicated, an optimal path, and issuing (410), to the host (432), an identification of the optimal path.

The example method depicted in FIG. 7 also includes detecting (704) a change to the host (432). A change to the host (432) may occur, for example, as the result of a software or hardware upgrade to the host (432), as the result of a loss of power to the host (432), as the result of a hardware or software failure on the host (432), as the result of the host (432) being moved, as the result of a new host being used to support the execution of some application that issues I/O operations that are directed to the dataset (412), or for a variety of other reasons. Readers will appreciate that a change to the host (432) may impact which particular data communications path is identified as the optimal path, and as such, the storage systems (414, 424, 428) may need to repeat the steps of identifying (408), from amongst the plurality of data communications paths (422, 426, 430) between the host (432) and the plurality of storage systems (414, 424, 428) across which a dataset (412) is synchronously replicated, an optimal path, and issuing (410), to the host (432), an identification of the optimal path.

Figure 8:
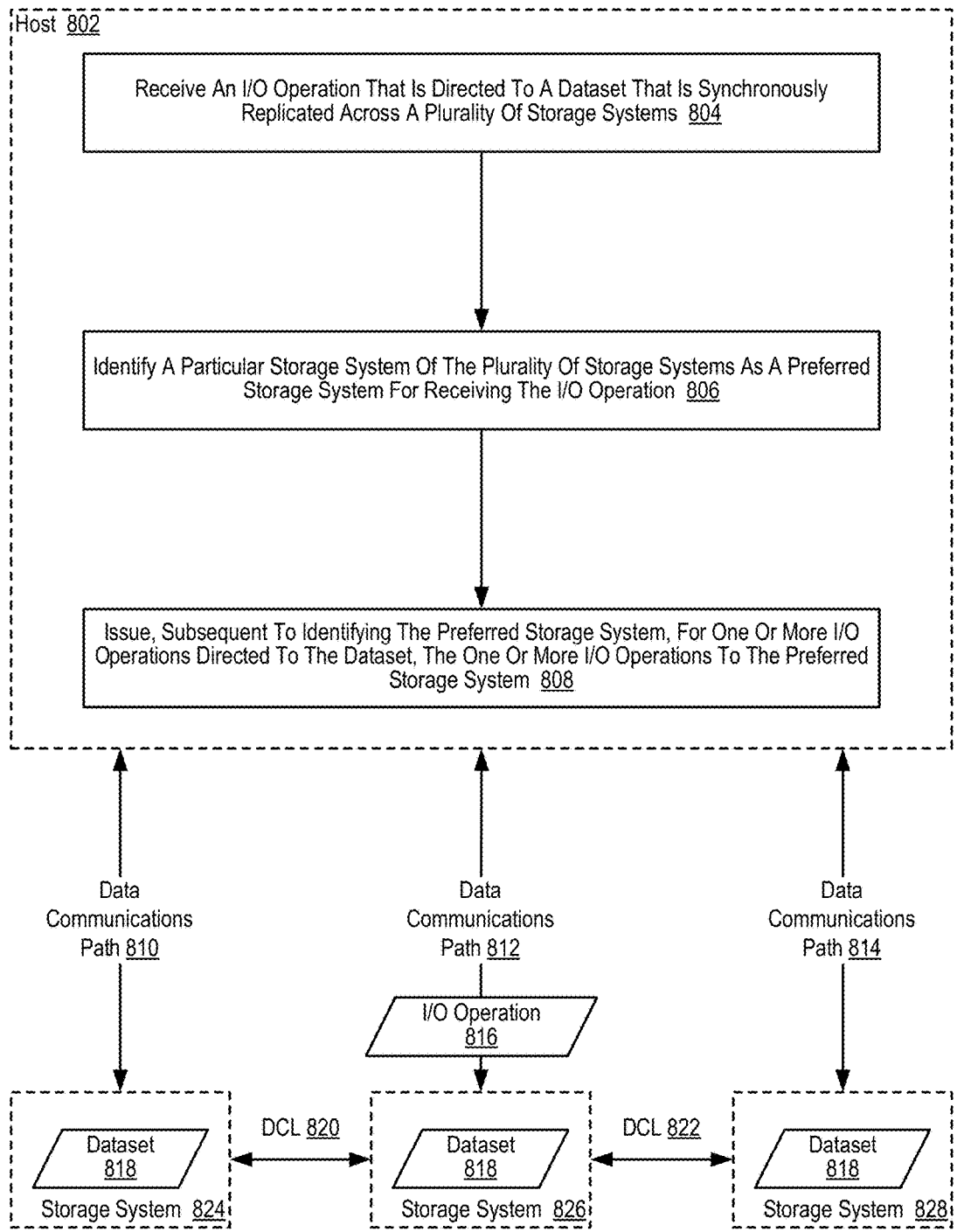
FIG. 8 sets forth a flow chart illustrating an additional example method for managing connectivity to synchronously replicated storage systems according to some embodiments of the present disclosure.

For further explanation, FIG. 8 sets forth a flow chart illustrating an additional example method of managing connectivity to synchronously replicated data across storage systems (824, 826, 828) according to embodiments of the present disclosure. Although depicted in less detail, the storage systems (824, 826, 828) depicted in FIG. 8 may be similar to the storage systems described above with reference to FIGS. 1A-1D, FIGS. 2A-2G, FIGS. 3A-3B, or any combination thereof. In fact, the storage system depicted in FIG. 8 may include the same, fewer, additional components as the storage systems described above. Furthermore, each of the storage systems (824, 826, 828) depicted in FIG. 8 may be connected to each other via one or more data communications links (820, 822) and also connected to the host (802) via one or more data communications paths (810, 812, 814).

The example method depicted in FIG. 8 includes receiving (804) an I/O operation (816) that is directed to a dataset (818) that is synchronously replicated across a plurality of storage systems (824, 826, 828). In the example method depicted in FIG. 8, the host (802) may receive (804) an I/O operation (816) that is directed to a dataset (818) that is synchronously replicated across a plurality of storage systems (824, 826, 828), for example, from an application that is executing on the host, as the result of some user interaction with the host (802), or in a variety of other ways. The I/O operation (816) that is directed to a dataset (818) that is synchronously replicated across a plurality of storage systems (824, 826, 828) may be embodied, for example, as a request to write data to the dataset (818), as a request to read data from the dataset (818), as a request to copy the data in the dataset (818) and store such a copy elsewhere, as a request to take a snapshot of the data in the dataset (818), and so on.

The example method depicted in FIG. 8 also includes identifying (806) a particular storage system (826) of the plurality of storage systems (824, 826, 828) as a preferred storage system for receiving the I/O operation (816). In the example method depicted in FIG. 8, the host (802) may identify (806) a particular storage system (826) of the plurality of storage systems (824, 826, 828) as a preferred storage system for receiving the I/O operation (816), for example, by tracking (or otherwise having access to information describing) response times that the host (802) has previously experienced when issuing I/O operations to each of the storage systems (824, 826, 828) and selecting the storage system (826) that exhibited the fastest response time as the preferred storage system for receiving the I/O operation (816). Readers will appreciate that the host (832) may track or otherwise having access to information describing other metrics (e.g., reliability related metrics, availability related metrics, throughput metrics) that may be used alone or in combination to identify (806) a particular storage system (826) as a preferred storage system for receiving the I/O operation (816). Alternatively, the host (802) may be configured to receive an identification of the preferred storage system from a system administrator, as a configuration parameter, from the storage arrays themselves, or in some other way, such that identifying (806) a particular storage system (826) as a preferred storage system for receiving the I/O operation (816) may be carried out by simply examining some configuration parameter or other configuration information stored within the host (802).

The example method depicted in FIG. 8 also includes issuing (808), subsequent to identifying the preferred storage system (826), for one or more I/O operations (816) directed to the dataset (818), the one or more I/O operations (816) to the preferred storage system (826). In the example method depicted in FIG. 8, the host (802) may issue (808) the one or more I/O operations (816) that are directed to the dataset (818) to the preferred storage system (826), for example, via one or more messages that are exchanged between the host (802) and the preferred storage system (826) over a data communications path (812) between the host (802) and the preferred storage system (826).

Figure 9:
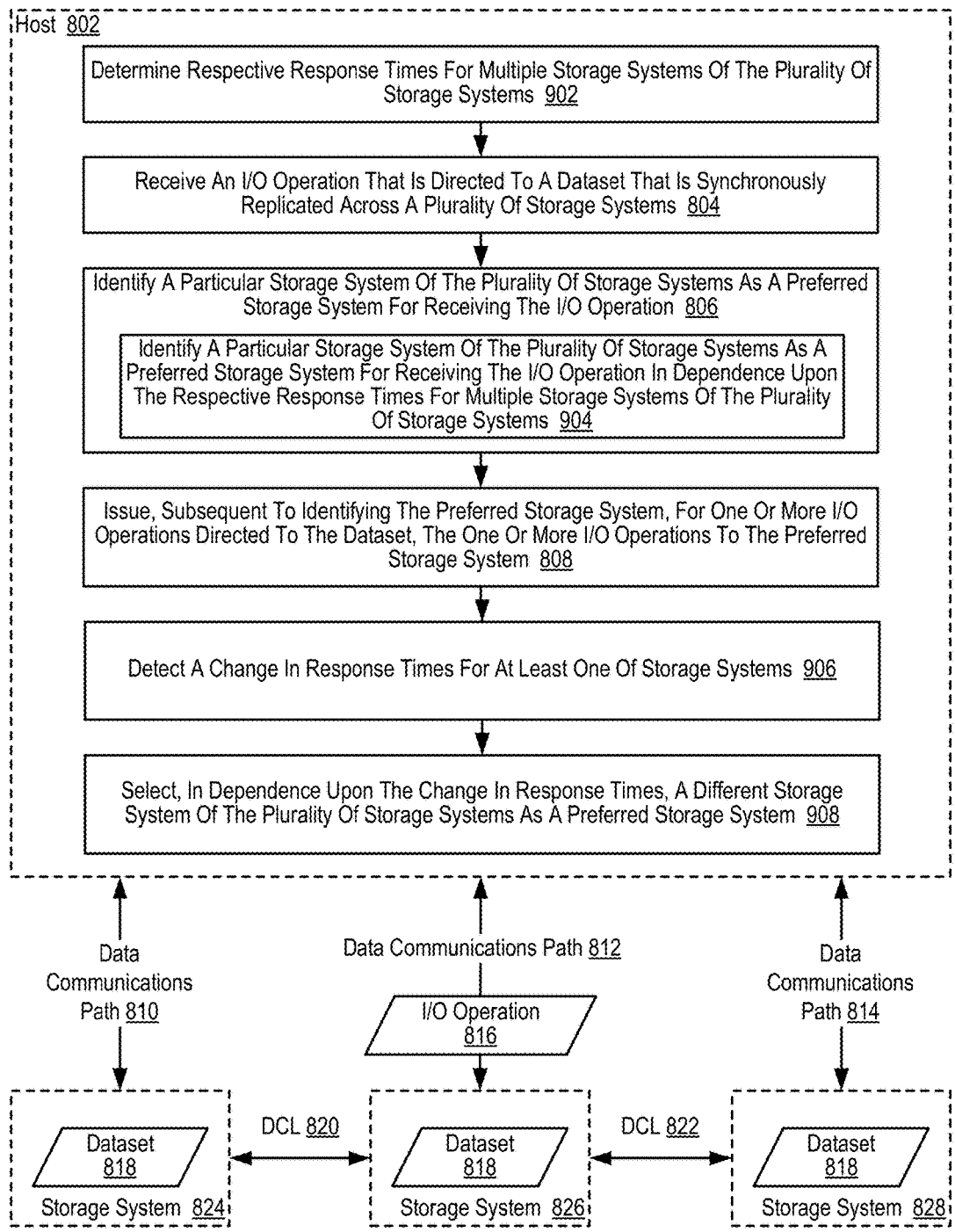
FIG. 9 sets forth a flow chart illustrating an additional example method for managing connectivity to synchronously replicated storage systems according to some embodiments of the present disclosure.

For further explanation, FIG. 9 sets forth a flow chart illustrating an additional example method of managing connectivity to synchronously replicated data across storage systems (824, 826, 828) according to embodiments of the present disclosure. Although depicted in less detail, the storage systems (824, 826, 828) depicted in FIG. 9 may be similar to the storage systems described above with reference to FIGS. 1A-1D, FIGS. 2A-2G, FIGS. 3A-3B, or any combination thereof. In fact, the storage system depicted in FIG. 9 may include the same, fewer, additional components as the storage systems described above.

The example method depicted in FIG. 9 is similar to the example method depicted in FIG. 8, as the example method depicted in FIG. 9 also includes receiving (804) an I/O operation (816) that is directed to a dataset (818) that is synchronously replicated across a plurality of storage systems (824, 826, 828), identifying (806) a particular storage system (826) of the plurality of storage systems (824, 826, 828) as a preferred storage system for receiving the I/O operation (816), and issuing (808), subsequent to identifying the preferred storage system (826), for one or more I/O operations (816) directed to the dataset (818), the one or more I/O operations (816) to the preferred storage system (826).

The example method depicted in FIG. 9 also includes determining (902) respective response times for multiple storage systems of the plurality of storage systems (824, 826, 828). In the example method depicted in FIG. 9, the host (802) may determine (902) respective response times for multiple storage systems of the plurality of storage systems (824, 826, 828), for example, by determining the amount of time required by each of the storage systems (824,

826, 828) to service similar I/O operations, by tracking the average amount of time required by each of the storage systems (824, 826, 828) to service similar I/O operations, and so on. In such an example, the host (802) may track such information through the use of one or more internal clocks, by examining timestamps attached to one or more messages, or in some other way.

In the example method depicted in FIG. 9, identifying (806) a particular storage system (826) of the plurality of storage systems (824, 826, 828) as a preferred storage system for receiving the I/O operation (816) can include identifying (904) a particular storage system of the plurality of storage systems (824, 826, 828) as a preferred storage system for receiving the I/O operation (816) in dependence upon the respective response times for multiple storage systems of the plurality of storage systems (824, 826, 828). In the example method depicted in FIG. 9, the host (802) may identify (904) a particular storage system of the plurality of storage systems (824, 826, 828) as a preferred storage system for receiving the I/O operation (816) in dependence upon the respective response times for multiple storage systems of the plurality of storage systems (824, 826, 828), for example, by selecting the storage system associated with the fastest response times as the preferred storage system, by selecting any storage system whose response times satisfy a predetermined quality of service threshold as the preferred storage system, or in some other way.

The example method depicted in FIG. 9 also includes detecting (906) a change in response times for at least one of the storage systems (824, 826, 828). In the example method depicted in FIG. 9, the host (802) may detecting (906) a change in response times for at least one of the storage systems (824, 826, 828) as the result of running additional tests against each of the storage systems, by determining that an average response time has deviated by more than a predetermined threshold amount, by detecting some disruption to the ability to exchange messages over a particular data communications link, or on some other way.

The example method depicted in FIG. 9 also includes selecting (908), in dependence upon the change in response times, a different storage system of the plurality of storage systems (824, 826, 828) as a preferred storage system. In the example method depicted in FIG. 9, the host (802) may select (908) a different storage system of the plurality of storage systems (824, 826, 828) as a preferred storage system for receiving the I/O operation (816), for example, by selecting the storage system associated with the fastest updated response times as the preferred storage system, by selecting any storage system whose updated response times satisfy a predetermined quality of service threshold as the preferred storage system, or in some other way.

Figure 10:
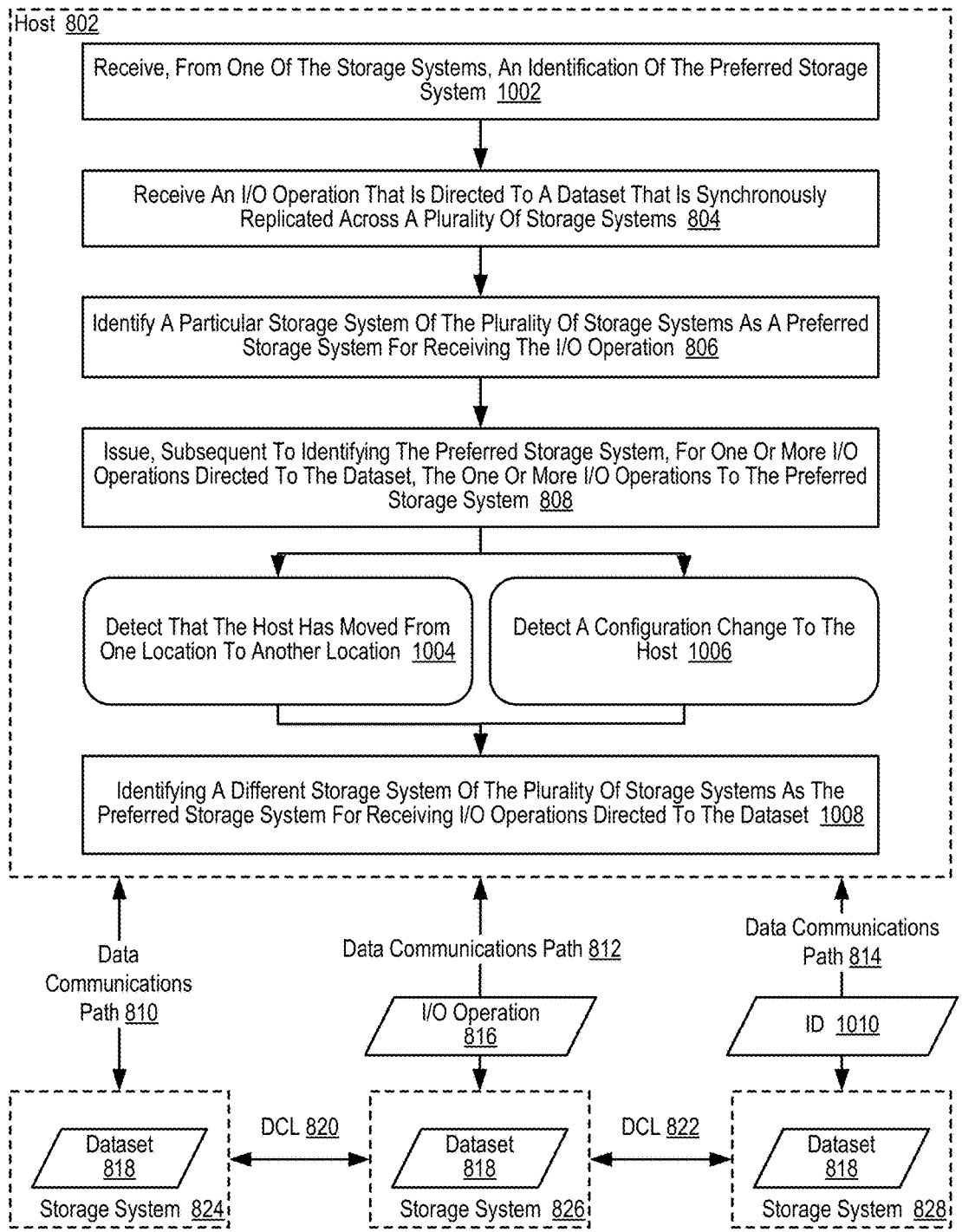
FIG. 10 sets forth a flow chart illustrating an additional example method for managing connectivity to synchronously replicated storage systems according to some embodiments of the present disclosure.

For further explanation, FIG. 10 sets forth a flow chart illustrating an additional example method of managing connectivity to synchronously replicated data across storage systems (824, 826, 828) according to embodiments of the present disclosure. Although depicted in less detail, the storage systems (824, 826, 828) depicted in FIG. 10 may be similar to the storage systems described above with reference to FIGS. 1A-1D, FIGS. 2A-2G, FIGS. 3A-3B, or any combination thereof. In fact, the storage system depicted in FIG. 10 may include the same, fewer, additional components as the storage systems described above.

The example method depicted in FIG. 10 is similar to the example method depicted in FIG. 8, as the example method depicted in FIG. 10 also includes receiving (804) an I/O operation (816) that is directed to a dataset (818) that is synchronously replicated across a plurality of storage systems (824, 826, 828), identifying (806) a particular storage system (826) of the plurality of storage systems (824, 826, 828) as a preferred storage system for receiving the I/O operation (816), and issuing (808), subsequent to identifying the preferred storage system (826), for one or more I/O operations (816) directed to the dataset (818), the one or more I/O operations (816) to the preferred storage system (826).

The example method depicted in FIG. 10 also includes receiving (1002), from one of the storage systems (828), an identification (1010) of the preferred storage system. In the example method depicted in FIG. 10, the host (802) may receiving (1002) an identification (1010) of the preferred storage system from one of the storage systems (828) via one or more messages that are exchanged via a data communications path (814) between the storage system (828) and the host (802). The host (802) may retain the identification (1010) of the preferred storage system, for example, as a configuration setting that is stored within the host. As such, identifying (806) a particular storage system (826) of the plurality of storage systems (824, 826, 828) as a preferred storage system for receiving the I/O operation (816) may be carried out in dependence upon a configuration setting, although in other embodiments the configuration setting may be set in a different way (e.g., by a system administrator, by another software module executing on the host).

The example method depicted in FIG. 10 also includes detecting (1004) that the host (802) has moved from one location to another location. In the example method depicted in FIG. 10, the host (802) may detect (1004) that the it has moved from one location to another location, for example, by determining that the host (802) has been connected to a new data communications interconnect, by detecting that the host (802) has been mounted within a different position within a rack or mounted within a new rack, or in some other way. Location relative to racks or within a data center, or based on data center or campus network topology may be an aspect of "locality" that can affect performance between a host and a particular storage system for a pod. In a single storage system that spans racks or that is connected to multiple networks, locality might even apply to individual storage network adapters on an individual storage system within a pod.

The example method depicted in FIG. 10 also includes identifying (1008) a different storage system of the plurality of storage systems as the preferred storage system for receiving I/O operations directed to the dataset (818). In the example method depicted in FIG. 10, the host (802) may identify (1008) a different storage system of the plurality of storage systems as the preferred storage system for receiving I/O operations directed to the dataset (818), for example, by re-measuring the response times associated with each of the storage systems and selecting the storage system that exhibits the fastest response times. In the example method depicted in FIG. 10, identifying (1008) a different storage system of the plurality of storage systems as the preferred storage system for receiving I/O operations directed to the dataset (818) may be carried out in response to detecting that the host (802) has moved.

The example method depicted in FIG. 10 also includes detecting (1006) a configuration change to the host (802). In the example method depicted in FIG. 10, the host (802) may detect (1006) a configuration change to the host (802), for example, by detecting that a different version of some software has been installed on the host (802), by detecting that some hardware component within the host (802) has been changed or added, and so on. In the example method depicted in FIG. 10, identifying (1008) a different storage system of the plurality of storage systems as the preferred storage system for receiving I/O operations directed to the dataset (818) may alternatively be carried out in response to detecting the configuration change to the host (802).

Example embodiments are described largely in the context of a fully functional computer system for managing connectivity to synchronously replicated storage systems. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of managing host definitions across a plurality of storage systems, the method comprising:
creating, on a first storage system, a host definition describing a host that accesses a dataset that is replicated across a plurality of storage systems;
determining whether a second storage system that the dataset is replicated across includes a definition of the host;
responsive to determining that the second storage system does not include the definition of the host, copying the host definition created on the first storage system to the second storage system;
responsive to determining that the second storage system does include the definition of the host:
determining whether the host definition created on the first storage system conflicts with the definition of the host on the second storage system including determining that the host definition created on the first storage system and the definition of the host on the second storage system have at least one overlapping interface;
responsive to determining that the host definition created on the first storage system does not conflict with the definition of the host on the second storage system, linking the host definition created on the first storage system to the definition of the host on the second storage system; and
responsive to determining that the host definition created on the first storage system conflicts with the definition of the host on the second storage system, retaining the definition of the host on the second storage system.

2. The method of claim 1 wherein determining whether the host definition created on the first storage system conflicts with the definition of the host on the second storage system further comprises determining whether the host is associated with a first set of host interfaces on the first storage system and the host is associated with a different set of host interfaces on the second storage system.

3. The method of claim 1 further comprising:
detecting a change to the host definition created on the first storage system;
determining whether the host definition created on the first storage system is linked to definitions of the host on any other storage systems; and
responsive to determining that the host definition created on the first storage system is linked to the definitions of the host on any other storage systems, updating the definitions of the host on the other storage systems to match a changed version of the host definition created on the first storage system.

4. The method of claim 1 further comprising:
adding an additional storage system to the plurality of storage systems across which the dataset is replicated;
determining whether the additional storage system includes a definition of the host;
responsive to determining that the additional storage system does not include the definition of the host, copying the host definition created on the first storage system or the second storage system to the additional storage system; and
responsive to determining that the additional storage system does include the definition of the host:
determining whether the host definition created on the first storage system or the definition of the host on the second storage system does not conflict with the definition of the host on the additional storage system;
responsive to determining that the host definition created on the first storage system or the definition of the host on the second storage system does not conflict with the definition of the host on the additional storage system, linking the non-conflicting host definition on the first storage system or the second storage system to the definition of the host on the additional storage system; and
responsive to determining that both the host definition created on the first storage system or the definition of the host on the second storage system conflict with the definition of the host on the additional storage system, retaining the definition of the host on the additional storage system.

5. The method of claim 1 wherein the host definition created on the first storage system or the definition of the host on the second storage system includes an identification of a preferred storage system to be used by the host when accessing the dataset that is replicated across the plurality of storage systems.

6. The method of claim 1 wherein the host definition created on the first storage system or the definition of the host on the second storage system includes an identification of network interfaces for the host.

7. An apparatus for managing host definitions across a plurality of storage systems, the apparatus comprising a computer processor, a computer memory operatively coupled to the computer processor, the computer memory having disposed within it computer program instructions that, when executed by the computer processor, cause the apparatus to carry out steps of:

creating, on a first storage system, a host definition describing a host that accesses a dataset that is replicated across a plurality of storage systems;
determining whether a second storage system that the dataset is replicated across includes a definition of the host;
responsive to determining that the second storage system does not include the definition of the host, copying the host definition created on the first storage system to the second storage system;
responsive to determining that the second storage system does include the definition of the host:
  determining whether the host definition created on the first storage system conflicts with the definition of the host on the second storage system including determining that the host definition created on the first storage system and the definition of the host on the second storage system have at least one overlapping interface;
  responsive to determining that the host definition created on the first storage system does not conflict with the definition of the host on the second storage system, linking the host definition created on the first storage system to the definition of the host on the second storage system; and
  responsive to determining that the host definition created on the first storage system conflicts with the definition of the host on the second storage system, retaining the definition of the host on the second storage system.

8. The apparatus of claim 7 wherein determining whether the host definition created on the first storage system conflicts with the definition of the host on the second storage system further comprises determining whether the host is associated with a first set of host interfaces on the first storage system and the host is associated with a different set of host interfaces on the second storage system.

9. The apparatus of claim 7 further comprising computer program instructions that, when executed by the computer processor, cause the apparatus to carry out the steps of:
  detecting a change to the host definition created on the first storage system;
  determining whether the host definition created on the first storage system is linked to definitions of the host on any other storage systems; and
  responsive to determining that the host definition created on the first storage system is linked to the definitions of the host on any other storage systems, updating the definitions of the host on the other storage systems to match a changed version of the host definition created on the first storage system.

10. The apparatus of claim 7 further comprising computer program instructions that, when executed by the computer processor, cause the apparatus to carry out the steps of:
  adding an additional storage system to the plurality of storage systems across which the dataset is replicated;
  determining whether the additional storage system includes a definition of the host;
  responsive to determining that the additional storage system does not include the definition of the host, copying the host definition created on the first storage system or the second storage system to the additional storage system; and
  responsive to determining that the additional storage system does include the definition of the host:
    determining whether the host definition created on the first storage system or the definition of the host on the second storage system does not conflict with the definition of the host on the additional storage system;
    responsive to determining that the host definition created on the first storage system or the definition of the host on the second storage system does not conflict with the definition of the host on the additional storage system, linking the non-conflicting host definition on the first storage system or the second storage system to the definition of the host on the additional storage system; and
    responsive to determining that both the host definition created on the first storage system or the definition of the host on the second storage system conflict with the definition of the host on the additional storage system, retaining the definition of the host on the additional storage system.

11. The apparatus of claim 7 wherein the host definition created on the first storage system or the definition of the host on the second storage system includes an identification of a preferred storage system to be used by the host when accessing the dataset that is replicated across the plurality of storage systems.

12. The apparatus of claim 7 wherein the host definition created on the first storage system or the definition of the host on the second storage system includes an identification of network interfaces for the host.

13. A storage system that includes a plurality of storage arrays, each storage array including a computer processor, a computer memory operatively coupled to the computer processor, the computer memory having disposed within it computer program instructions that, when executed by the computer processor, cause the storage system to carry out steps of:
  creating, on a first storage array, a host definition describing a host that accesses a dataset that is replicated across a plurality of storage arrays;
  determining whether a second storage array that the dataset is replicated across includes a definition of the host;
  responsive to determining that the second storage array does not include the definition of the host, copying the host definition created on the first storage array to the second storage array;
  responsive to determining that the second storage array does include the definition of the host:
    determining whether the host definition created on the first storage array conflicts with the definition of the host on the second storage array including determining that the host definition created on the first storage system and the definition of the host on the second storage system have at least one overlapping interface;
    responsive to determining that the host definition created on the first storage array does not conflict with the definition of the host on the second storage array, linking the host definition created on the first storage array to the definition of the host on the second storage array; and
    responsive to determining that the host definition created on the first storage array conflicts with the definition of the host on the second storage array, retaining the definition of the host on the second storage array.

14. The storage system of claim 13 wherein determining whether the host definition created on the first storage array conflicts with the definition of the host on the second storage array further comprises determining whether the host is associated with a first set of host interfaces on the first storage array and the host is associated with a different set of host interfaces on the second storage array.

15. The storage system of claim 13 further comprising computer program instructions that, when executed, cause the storage system to carry out the steps of:
   detecting a change to the host definition created on the first storage array;
   determining whether the host definition created on the first storage array is linked to definitions of the host on any other storage arrays; and
   responsive to determining that the host definition created on the first storage array is linked to the definitions of the host on any other storage arrays, updating the definitions of the host on the other storage arrays to match a changed version of the host definition created on the first storage array.

16. The storage system of claim 13 further comprising computer program instructions that, when executed, cause the storage system to carry out the steps of:
   adding an additional storage array to the plurality of storage arrays across which the dataset is replicated;
   determining whether the additional storage array includes a definition of the host;
   responsive to determining that the additional storage array does not include the definition of the host, copying the host definition created on the first storage array or the second storage array to the additional storage array; and
   responsive to determining that the additional storage array does include the definition of the host:
      determining whether the host definition created on the first storage array or the definition of the host on the second storage array does not conflict with the definition of the host on the additional storage array;
      responsive to determining that the host definition created on the first storage array or the definition of the host on the second storage array does not conflict with the definition of the host on the additional storage array, linking the non-conflicting host definition on the first storage array or the second storage array to the definition of the host on the additional storage array; and
      responsive to determining that both the host definition created on the first storage array or the definition of the host on the second storage array conflict with the definition of the host on the additional storage array, retaining the definition of the host on the additional storage array.

17. The storage system of claim 13 wherein the host definition created on the first storage system or the definition of the host on the second storage system includes an identification of a preferred storage system to be used by the host when accessing the dataset that is replicated across the plurality of storage systems.

18. The storage system of claim 13 wherein the host definition created on the first storage system or the definition of the host on the second storage system includes an identification of network interfaces for the host.

* * * * *